US012393577B2

(12) United States Patent
Weik

(10) Patent No.: US 12,393,577 B2
(45) Date of Patent: Aug. 19, 2025

(54) TECHNIQUES AND ARCHITECTURE FOR SECURING LARGE LANGUAGE MODEL ASSISTED INTERACTIONS WITH A DATA CATALOG

(71) Applicant: SAS INSTITUTE INC., Cary, NC (US)

(72) Inventor: David Hermann Peter Weik, Viernheim (DE)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 18/904,206

(22) Filed: Oct. 2, 2024

(65) Prior Publication Data

US 2025/0139088 A1 May 1, 2025

Related U.S. Application Data

(60) Provisional application No. 63/607,982, filed on Dec. 8, 2023, provisional application No. 63/545,729, filed on Oct. 25, 2023.

(51) Int. Cl.
G06F 16/242 (2019.01)
H04L 9/40 (2022.01)

(52) U.S. Cl.
CPC ......... *G06F 16/243* (2019.01); *H04L 63/102* (2013.01)

(58) Field of Classification Search
CPC ............ G06F 16/2365; G06F 11/3041; G06F 16/2358; G06F 16/258
See application file for complete search history.

(56) References Cited

U.S. PATENT DOCUMENTS

2020/0142889 A1* 5/2020 Yadav ............... G06F 40/30
2020/0210524 A1   7/2020 Yang et al.
2021/0103782 A1* 4/2021 Rubin ............... G06V 10/7715
(Continued)

OTHER PUBLICATIONS

International Search Report and Written Opinion in International Application No. PCT/US24/49568, mailed Dec. 18, 2024, 6 pages.

*Primary Examiner* — Aleksandr Kerzhner
*Assistant Examiner* — Aryan D Toughiry
(74) *Attorney, Agent, or Firm* — Padowithz Alce; Quintin Scheitlin; Alce PLLC

(57) ABSTRACT

A computer-implemented system, computer-implemented method, and computer-program product includes receiving a natural language query from a user for executing an analytical task; generating an analytical large language model (LLM) prompt based on the natural language query and, in response to generating the analytical LLM prompt, orchestrating an LLM-directed workflow for handling the natural language query by: automatically prompting, using the analytical LLM prompt, an analytical task-oriented LLM to generate a structured query for querying a data catalog application; querying the data catalog application using the structured query generated by the analytical task-oriented LLM; obtaining query results from the data catalog application, where the query results include metadata associated with at least one element accessible to the data catalog application; prompting the analytical task-oriented LLM to identify a given analytical task associated with a given analytical agent; and automatically executing, by the given analytical agent, the analytical task.

30 Claims, 28 Drawing Sheets

(56) References Cited

U.S. PATENT DOCUMENTS

| | | |
|---|---|---|
| 2021/0258321 A1* | 8/2021 | Vegulla .................... G06N 5/04 |
| 2023/0034011 A1 | 2/2023 | Sarkar et al. |
| 2023/0274094 A1 | 8/2023 | Tunstall-Pedoe et al. |
| 2024/0265124 A1* | 8/2024 | Frattura .............. G06F 21/6218 |
| 2024/0338528 A1* | 10/2024 | Wolfe ..................... G06F 40/35 |
| 2024/0362212 A1* | 10/2024 | Sun .................. G06F 16/24522 |
| 2024/0378399 A1* | 11/2024 | Gandhi ................ G06F 16/345 |

* cited by examiner

TECHNIQUES AND ARCHITECTURE FOR SECURING LARGE LANGUAGE MODEL ASSISTED INTERACTIONS WITH A DATA CATALOG

CROSS-REFERENCE TO RELATED APPLICATIONS

This application claims the benefit of priority to U.S. Provisional Application No. 63/607,982, filed on 8 Dec. 2023, which claims the benefit of priority to U.S. Provisional Application No. 63/545,729, filed on 25 Oct. 2023, the disclosures which are incorporated by reference herein their entireties.

TECHNICAL FIELD

The embodiments herein relate generally to database security and, more specifically, to techniques and an architecture for securing large language model assisted interactions with a data catalog.

BACKGROUND

The increasing complexity of modern data analytics has created challenges for systems that perform large-scale data processing and management. As data repositories and catalogs grow, the ability to interact with vast and diverse datasets has become more demanding, particularly when it comes to maintaining security, access control, and the generation of accurate results. Large language models (LLMs) have been employed to enable users to interact with data through natural language queries, facilitating more intuitive user experiences. However, these systems often suffer from limitations related to security, as LLMs may inadvertently allow unauthorized access to sensitive data or fail to accurately reflect the underlying data in their responses. Additionally, there is a risk that LLMs may generate inaccurate or misleading outputs due to their probabilistic nature, a phenomenon known as hallucination, which can result in flawed or unreliable data analyses.

Moreover, conventional systems tend to lack a structured mechanism for restricting access of LLMs to specific datasets or actions based on user credentials, increasing the risk of data breaches or leakage. In many existing approaches, LLMs interact directly with data, posing further risks when users do not have the appropriate privileges for certain data sets or tasks. Furthermore, the lack of separation between the query-handling capabilities of LLMs and the execution of data processing tasks often results in inaccuracies, especially when LLMs are tasked with generating results based on complex data sets.

Therefore, there is a clear need for an improved system that not only allows intuitive interaction with data catalogs using natural language queries but also provides a secure and structured approach to handling data, ensuring that users only perform actions they are authorized to execute. Furthermore, there is a need for a system that accurately reflects the content of the data catalog in its outputs, minimizing the risk of hallucinations and improving the overall reliability of data analytics processes.

BRIEF SUMMARY OF THE EMBODIMENT(S)

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

In some embodiments, a computer-program product includes a non-transitory machine-readable storage medium storing computer instructions that, when executed by one or more processors, perform operations comprising receiving, via a user interface, a natural language query from a user for executing at least one analytical task; generating an analytical large language model (LLM) prompt based on the natural language query; and in response to generating the analytical LLM prompt, orchestrating an LLM-directed workflow for handling the natural language query, by: automatically prompting, using the analytical LLM prompt, an analytical task-oriented LLM to generate at least one structured query for querying a data catalog application, wherein the at least one structured query includes a structured request relating to the at least one analytical task associated with the natural language query; querying the data catalog application using the at least one structured query generated by the analytical task-oriented LLM; obtaining query results from the data catalog application in response to the at least one structured query, wherein the query results include metadata associated with at least one element accessible to the data catalog application; prompting the analytical task-oriented LLM to identify a given analytical task from a plurality of analytical tasks associated with an analytical service executable by a given analytical agent of a plurality of analytical agents of the analytical service based on an input to the analytical task-oriented LLM of at least a portion of the metadata associated with the at least one element; and automatically executing, by the given analytical agent of the plurality of analytical agents, the given analytical task, based on the at least one element accessible to the data catalog application; and returning, via the user interface, an output response to the natural language query based on a completion of the given analytical task by the given analytical agent.

In some embodiments, the computer-program product may perform operations further comprising: selectively enabling access to a subset of analytical agents of the plurality of analytical agents and disabling access to a different subset of analytical agents of the plurality of analytical agents based on authorization credentials associated with the user, wherein the given analytical agent performing the given analytical task is selected from the subset of analytical agents.

In some embodiments, the computer-program product may perform operations further comprising: selectively enabling access to a subset of analytical LLMs of a plurality of LLMs and disabling access to a different subset of LLMs of the plurality of LLMs based on authorization credentials associated with the user, wherein the analytical task-oriented LLM associated with the LLM-directed workflow is selected from the subset of LLMs.

In some embodiments of the computer-program product, the natural language query includes a natural language analytical request and generating the at least one structured query includes transforming by the analytical task-oriented LLM the natural language analytical request to the at least one structured query based on query structures associated with the data catalog application.

In some embodiments of the computer-program product, the natural language query includes a natural language analytical request and the performing operations further include translating, by the analytical task-oriented LLM, the natural language analytical request to a plurality of structured queries, the plurality of structured queries having query structures associated with the data catalog application.

In some embodiments, the computer-program product may perform operations further comprising: allowing, via the user interface, dynamic user intervention within a midstream of the LLM-directed workflow, wherein the dynamic user intervention causes an interruption of one or more operations of the LLM-directed workflow in advance of the return of the output response.

In some embodiments of the computer-program product, the output response is indirectly facilitated through the analytical task-oriented LLM interfacing with the plurality of analytical agents programmed with functionalities for autonomously executing analytic tasks within an analytical computing environment.

In some embodiments of the computer-program product, each analytical agent of the plurality of analytical agents is uniquely assigned to automatically execute a distinct analytical task of the plurality of analytical tasks available within an analytical computing environment.

In some embodiments of the computer-program product, executing the given analytical task includes accessing data from one or more data structures that include the at least one element; and generating by the given analytical agent an analytical artifact based on the data accessed from the one or more data structures, wherein the output response includes the analytical artifact.

In some embodiments of the computer-program product, the analytical task-oriented LLM generates a prediction of one or more likely analytical tasks for handling the natural language query based on an input of the natural language query, and the given analytical agent is selectively activated from the plurality of analytical agents based on the user selecting the given analytical task from the one or more likely analytical tasks.

In some embodiments of the computer-program product, the LLM-directed workflow includes a sequence of automated operations for querying the data catalog application and generating the output response to the natural language query in response to one or more outputs of the analytical task-oriented LLM.

In some embodiments of the computer-program product, automatically executing, by the given analytical agent of the plurality of analytical agents, the given analytical task includes: identifying that a historical analytical artifact for handling the natural language query was previously stored within a memory, and retrieving from the memory the historical analytical artifact, wherein the output response includes the historical analytical artifact.

In some embodiments of the computer-program product, the data catalog application stores and manages metadata corresponding to diverse data sources, and the at least one structured query generated by the analytical task-oriented LLM includes one or more query parameters configured based on a metadata schema of the data catalog application.

In some embodiments of the computer-program product, each distinct analytical task of the plurality of analytical tasks maps to a distinct analytical agent of the plurality of analytical agents, and the analytical task-oriented LLM selects the given analytical agent of the plurality of analytical agents based on identifying a mapping between the given analytical task and the given analytical agent.

In some embodiments of the computer-program product, a vector encoder converts the natural language query to a vector representation; and assessing the vector representation of the natural language query against a plurality of vector representations of historical analytical responses to historical natural language queries that are stored within a computer database associated with the analytical service.

In some embodiments of the computer-program product, performing operations further includes: identifying a match between the vector representation of the natural language query and at least one vector representation of a historical analytical response from the computer database and bypassing a generation of a new output response to the natural language query based on the match between the vector representation of the natural language query and the at least one vector representation of a historical analytical response, wherein the output response includes the historical analytical response.

In some embodiments of the computer-program product, generating the analytical LLM prompt based on the natural language query includes classifying, by a question classification model, the natural language query to at least a first given query type of a plurality of distinct query types; in response to the classification of the natural language query, mapping the first given query type associated with the natural language query to a first analytical LLM prompt of a plurality of distinct analytical LLM prompts designed for the analytical task-oriented LLM; and generating the analytical prompt based on the first analytical LLM prompt.

In some embodiments of the computer-program product, generating the analytical LLM prompt based on the natural language query further includes classifying, by the question classification model, the natural language query to at least a second given query type of a plurality of distinct query types; in response to the classification of the natural language query, mapping the second given query type associated with the natural language query to a second analytical LLM prompt of the plurality of distinct analytical LLM prompts designed for the analytical task-oriented LLM; and generating the analytical prompt based on the first analytical LLM prompt and the second analytical LLM prompt, wherein the analytical prompt includes a compound analytical LLM prompt that converges the first analytical LLM prompt and the second analytical LLM prompt into a single prompt input to the analytical task-oriented LLM.

In some embodiments of the computer-program product, the analytical task-oriented LLM parses the natural language query into distinct query components, each distinct query component corresponds to a different aspect of a metadata schema of the data catalog application, and the analytical task-oriented LLM constructs a multi-part structured query based on the distinct query components of the natural language query.

In some embodiments of the computer-program product, each analytical agent of the plurality of analytical agents includes a software module or a computational module, implemented by one or more computers of the analytical service, that is programmed to execute at least one analytical task autonomously within an analytical computing environment based on input data and metadata retrieved from the data catalog application.

In some embodiments of the computer-program product, generating the analytical LLM prompt includes: converting the natural language query to one or more embeddings or one or more vectors; and mapping the one or more embeddings or the one or more vectors into a N-dimensional space including a set of N distinct vectors, wherein each vector corresponds to a distinct analytical LLM prompt of a set of analytical LLM prompts; and selecting the analytical LLM prompt from the set of analytical LLM prompts based at least in part on the mapping.

In some embodiments of the computer-program product, prompting the analytical task-oriented LLM to generate the at least one structured query for querying the data catalog application includes providing, to a first application programming interface (API) endpoint, first signaling that includes an indication of the analytical LLM prompt; and receiving, from the first API endpoint, second signaling that includes a message for an API function call, wherein the message includes an indication of the at least one structured query, and wherein querying the data catalog application includes routing the API function call to a second API endpoint associated with the data catalog application.

In some embodiments, a computer-implemented method, comprising: receiving, via a user interface, a natural language query from a user for executing at least one analytical task; generating an analytical large language model (LLM) prompt based on the natural language query; and in response to generating the analytical LLM prompt, orchestrating an LLM-directed workflow for handling the natural language query, by: automatically prompting, using the analytical LLM prompt, an analytical task-oriented LLM to generate at least one structured query for querying a data catalog application, wherein the at least one structured query includes a structured request relating to the at least one analytical task associated with the natural language query; querying the data catalog application using the at least one structured query generated by the analytical task-oriented LLM; obtaining query results from the data catalog application in response to the at least one structured query, wherein the query results include metadata associated with at least one element accessible to the data catalog application; prompting the analytical task-oriented LLM to identify a given analytical task from a plurality of analytical tasks associated with an analytical service executable by a given analytical agent of a plurality of analytical agents of the analytical service based on an input to the analytical task-oriented LLM of at least a portion of the metadata associated with the at least one element; and automatically executing, by the given analytical agent of the plurality of analytical agents, the given analytical task, based on the at least one element accessible to the data catalog application; and returning, via the user interface, an output response to the natural language query based on a completion of the given analytical task by the given analytical agent.

In some embodiments, the computer-implemented method further includes: selectively enabling access to a subset of analytical agents of the plurality of analytical agents and disabling access to a different subset of analytical agents of the plurality of analytical agents based on authorization credentials associated with the user, wherein the given analytical agent performing the given analytical task is selected from the subset of analytical agents.

In some embodiments, the computer-implemented method further includes: selectively enabling access to a subset of analytical LLMs of a plurality of LLMs and disabling access to a different subset of LLMs of the plurality of LLMs based on authorization credentials associated with the user, wherein the analytical task-oriented LLM associated with the LLM-directed workflow is selected from the subset of LLMs.

In some embodiments of the computer-implemented method, the natural language query includes a natural language analytical request and generating the at least one structured query includes transforming by the analytical task-oriented LLM the natural language analytical request to the at least one structured query based on query structures associated with the data catalog application.

A computer-implemented system, comprising: one or more processors; a memory; and a computer-readable medium operably coupled to the one or more processors, the computer-readable medium having computer-readable instructions stored thereon that, when executed by the one or more processors, cause a computing device to perform operations comprising: receiving, via a user interface, a natural language query from a user for executing at least one analytical task; generating an analytical large language model (LLM) prompt based on the natural language query; and in response to generating the analytical LLM prompt, orchestrating an LLM-directed workflow for handling the natural language query, by: automatically prompting, using the analytical LLM prompt, an analytical task-oriented LLM to generate at least one structured query for querying a data catalog application, wherein the at least one structured query includes a structured request relating to the at least one analytical task associated with the natural language query; querying the data catalog application using the at least one structured query generated by the analytical task-oriented LLM; obtaining query results from the data catalog application in response to the at least one structured query, wherein the query results include metadata associated with at least one element accessible to the data catalog application; prompting the analytical task-oriented LLM to identify a given analytical task from a plurality of analytical tasks associated with an analytical service executable by a given analytical agent of a plurality of analytical agents of the analytical service based on an input to the analytical task-oriented LLM of at least a portion of the metadata associated with the at least one element; and automatically executing, by the given analytical agent of the plurality of analytical agents, the given analytical task, based on the at least one element accessible to the data catalog application; and returning, via the user interface, an output response to the natural language query based on a completion of the given analytical task by the given analytical agent.

In some embodiments of the computer-implemented system, the computer-readable instructions, when executed by the one or more processors, cause the computing device to perform operations comprising: selectively enabling access to a subset of analytical agents of the plurality of analytical agents and disabling access to different subset of analytical agents of the plurality of analytical agents based on authorization credentials associated with the user, wherein the given analytical agent performing the given analytical task is selected from the subset of analytical agents.

In some embodiments of the computer-implemented system, the computer-readable instructions, when executed by the one or more processors, cause the computing device to perform operations comprising selectively enabling access to a subset of analytical LLMs of a plurality of LLMs and disabling access to a different subset of LLMs of the plurality of LLMs based on authorization credentials associated with the user, wherein the analytical task-oriented LLM associated with the LLM-directed workflow is selected from the subset of LLMs.

In some embodiments, the natural language query includes a natural language analytical request and generating the at least one structured query includes transforming by the analytical task-oriented LLM the natural language analytical request to the at least one structured query based on query structures associated with the data catalog application.

DESCRIPTION OF THE PREFERRED EMBODIMENTS

Overview of Technical Benefits

Figure 1:
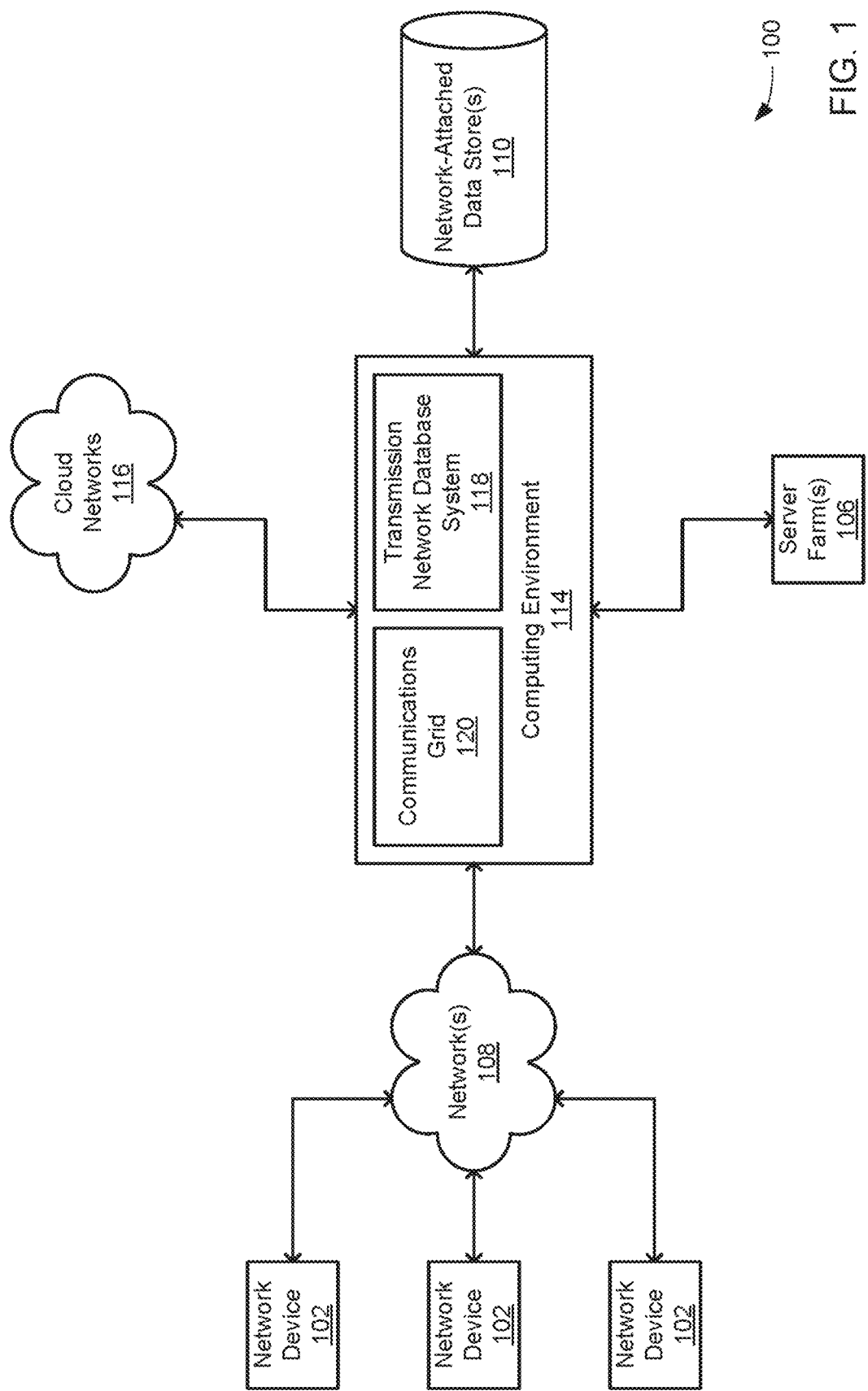
FIG. 1 illustrates a block diagram that provides an illustration of the hardware components of a computing system, according to some embodiments of the present technology.

As described in more detail herein, the systems, methods, and embodiments incorporate a novel data catalog approach that improves data security and data privacy when interacting with large language models (LLMs). The data catalog approach addresses the technical problem of preventing unauthorized access to sensitive data while still enabling effective data querying. One technical feature that contributes to the inventive step is the restriction of LLM access solely to metadata, rather than the raw data itself that may be referenced by the data catalog. This technical solution mitigates the risk of data breaches, a technical problem not adequately solved by conventional methods that often expose substantial amounts of raw data to processing systems. By confining LLM operations to anonymized metadata, the data catalog approach provides a secure yet functional environment for complex data analysis. Another technical benefit includes the data catalog approach's ability to ensure compliance with stringent data privacy regulations. The controlled flow of information between the LLM and the data catalog, which ensures that raw data is not directly exposed, represents a technical advance over other systems that lack such sophisticated data handling and stringent data processing mechanisms. This technical improvement is not only technically advantageous but also addresses an industry challenge in maintaining data privacy.

Furthermore, as described in more detail herein, the systems, methods, and embodiments address the technical problem of LLM hallucination—where LLMs generate incorrect or misleading information—by implementing a novel grounding mechanism. The grounding mechanism ensures that LLM outputs are based on structured metadata from a trusted data catalog. A key technical feature contributing to the inventive step is the use of metadata to anchor LLM outputs, ensuring that generated responses are rooted in verifiable data. In operation, the metadata associated with a trusted data catalog may be converted to vector representations in a specifically designed or configured n-dimensional space. This n-dimensional may be specifically designed and/or constrained to include only vector representations or embeddings of the metadata that the LLMs may compute against for generating a response to a user query. That is, the embodiments of the present application may restrict the operation of the inferences or predictions of the LLMs to one or more of the vector representations within the n-dimensional space thereby precluding hallucinations that may be outside the scope of the intended responses available to user queries. The grounding mechanism contrasts with traditional LLM applications, where outputs are often generated without sufficient grounding, leading to a higher risk of inaccuracies. The inventive approach reduces the occurrence of hallucinations, offering a more reliable and accurate system for data-driven decision-making. The grounding mechanism's ability to enhance the trustworthiness of LLM outputs is another non-obvious technical contribution. By ensuring that all outputs are backed by structured and validated data, the grounding mechanism not only improves accuracy but also solves a problem in the deployment of LLMs for sensitive applications, which enhances data integrity used and/or generated throughout the methods and/or systems described herein.

Moreover, as described in more detail herein, the systems, methods, and embodiments provide a novel approach to user control over LLM interactions, allowing dynamic adjustment of the system's autonomy. The user control approach addresses the technical problem of balancing automation with user control in complex data processing environments. The inventive step is evidenced by the user control approach's ability to offer varying levels of control-ranging from fully automated to semi-automated and manual modes-based on user selection. This feature is technically advantageous as it enables the system to adapt to different user expertise levels and organizational needs, a capability not found in conventional systems that typically offer limited or rigid interaction modes. Another inventive contribution is the user control approach's flexibility in adjusting its level of automation in real-time, enhancing usability across diverse operational settings. This adaptability solves the problem of how to effectively manage user interactions with advanced machine learning systems, which distinguishes it from existing methods.

Furthermore, as described in more detail herein, the systems, methods, and embodiments optimize LLM cost and resource management through innovative real-time monitoring and token management techniques. The cost and resource management approach addresses the technical problem of controlling computational costs while maintaining high performance in LLM operations. A technical feature that underpins the inventive step is the real-time tracking and management of input and output tokens during LLM interactions. The token management technique allows the system to optimize resource usage dynamically, preventing excessive computational expenditures-a problem inadequately addressed by existing systems that often lack such granular control mechanisms. The cost and resource management approach's ability to store and reuse previous query results further contributes to the inventive step. This feature reduces redundant processing tasks, leading to faster response times and lower operational costs. The inventive approach provides a more efficient solution for deploying LLMs at scale, distinguishing it from conventional methods that fail to offer such optimization.

Moreover, as described in more detail herein, the systems, methods, and embodiments enhance reproducibility and auditability by implementing a comprehensive documentation process for all user and LLM interactions. The documentation process addresses the technical problem of maintaining transparency and accountability in complex machine learning processes. The inventive step is evidenced by the documentation process's ability to systematically document every interaction and decision made by both the user and the LLM. The documentation process solves the problem of how to create a verifiable audit trail in environments where machine learning systems play a role, a challenge not adequately addressed by prior art. Another inventive aspect is the documentation process's facilitation of compliance with regulatory requirements through its detailed audit trails. This feature not only improves the ability to review and replicate processes but also ensures adherence to legal standards, offering a technical advantage over existing systems that lack such robust compliance mechanisms.

The following description of the preferred embodiments are not intended to limit scope to these preferred embodiments, but rather to enable any person skilled in the art to make and use these preferred embodiments.

EXAMPLE SYSTEMS

Systems depicted in some of the figures may be provided in various configurations. In some embodiments, the systems may be configured as a distributed system where one or more components of the system are distributed across one or more networks in a cloud computing system.

FIG. 1 is a block diagram that provides an illustration of the hardware components of a data transmission network 100, according to embodiments of the present technology. Data transmission network 100 is a computer system that may be used for processing large amounts of data where a large number of computer processing cycles are required.

Data transmission network 100 may also include computing environment 114. Computing environment 114 may be a computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
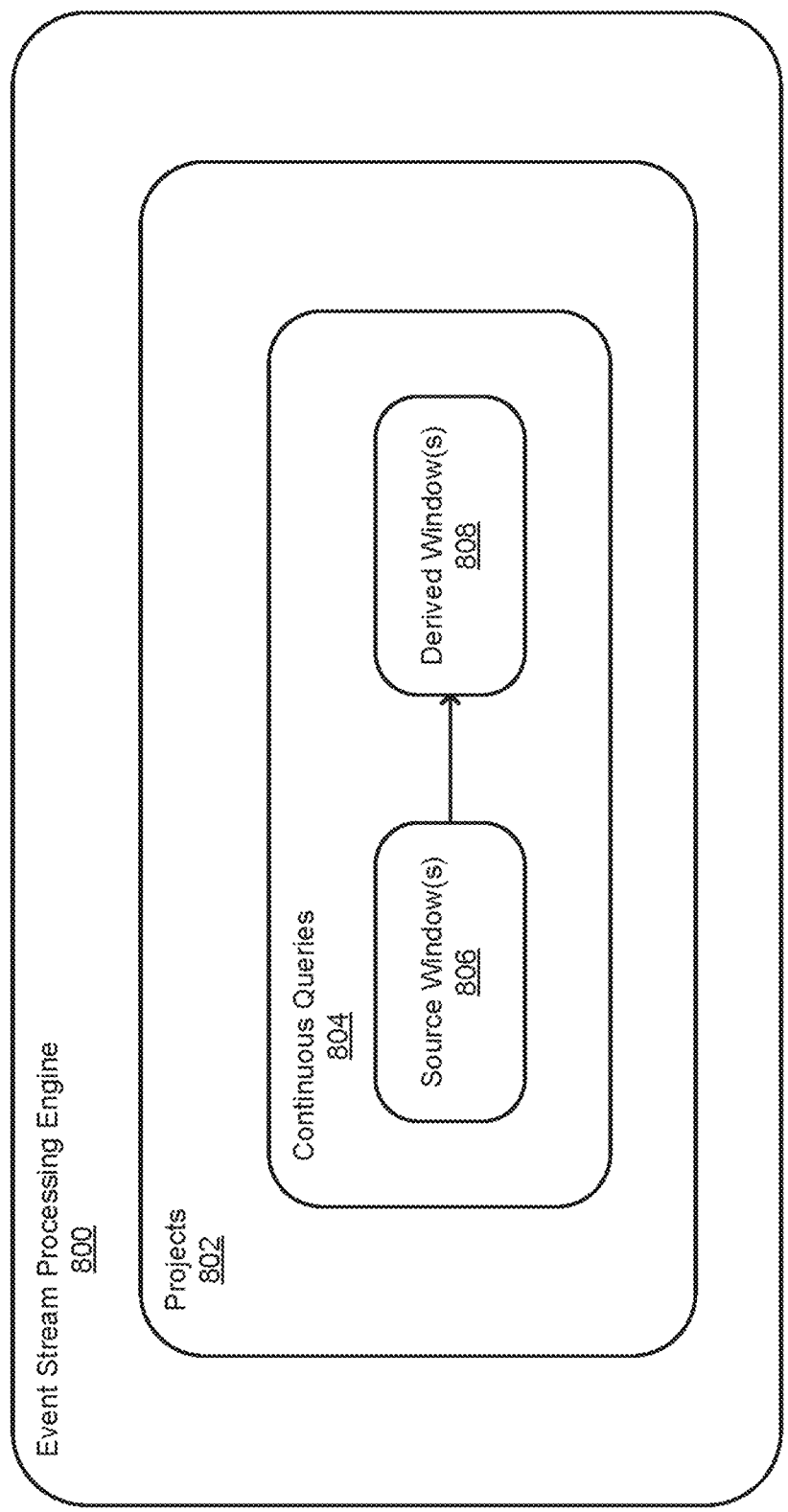
FIG. 8 illustrates a block diagram including components of an Event Stream Processing Engine (ESPE), according to some embodiments of the present technology.
Figure 9:
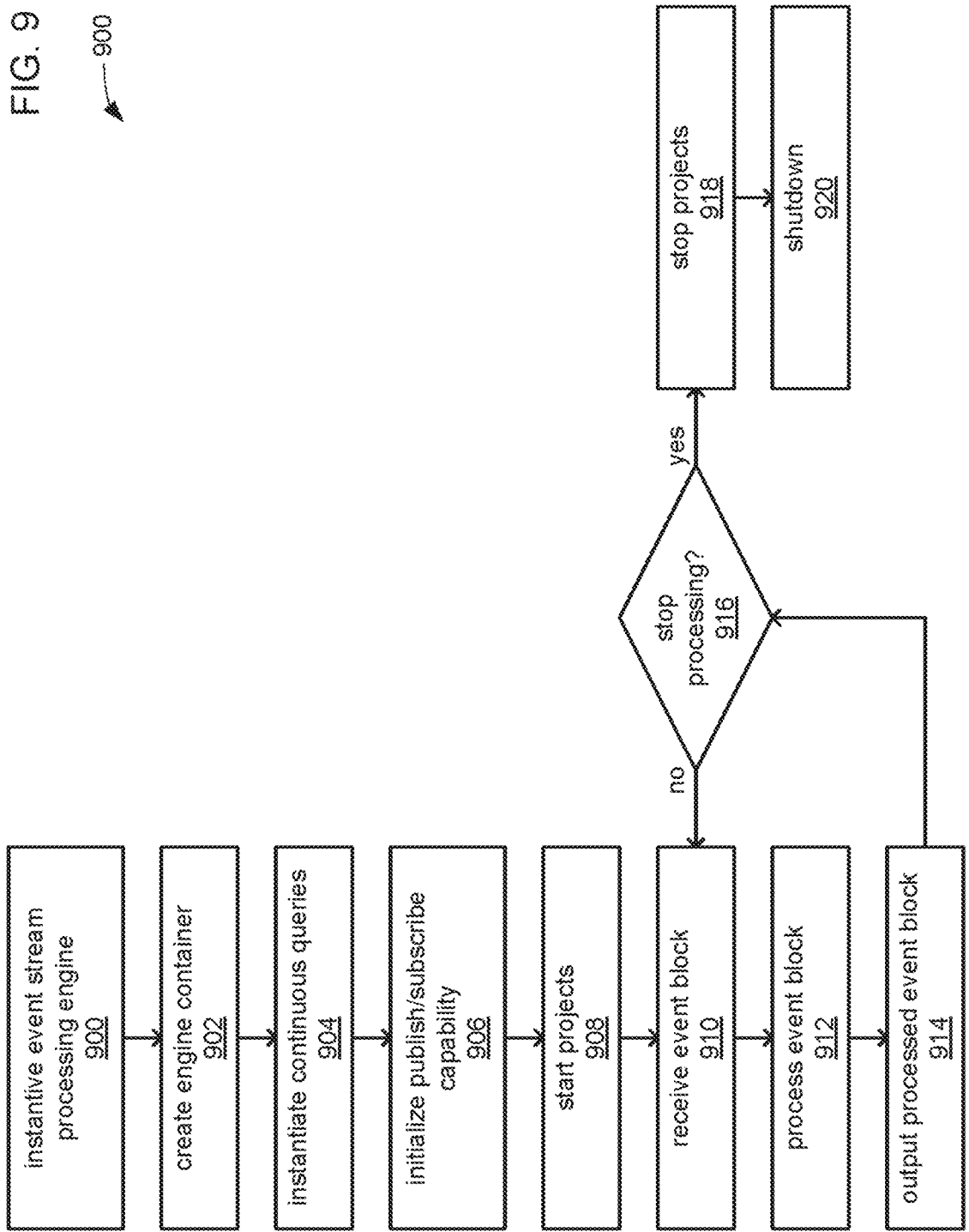
FIG. 9 illustrates a flow chart showing an example process including operations performed by an event stream processing engine, according to some embodiments of the present technology.
Figure 10:
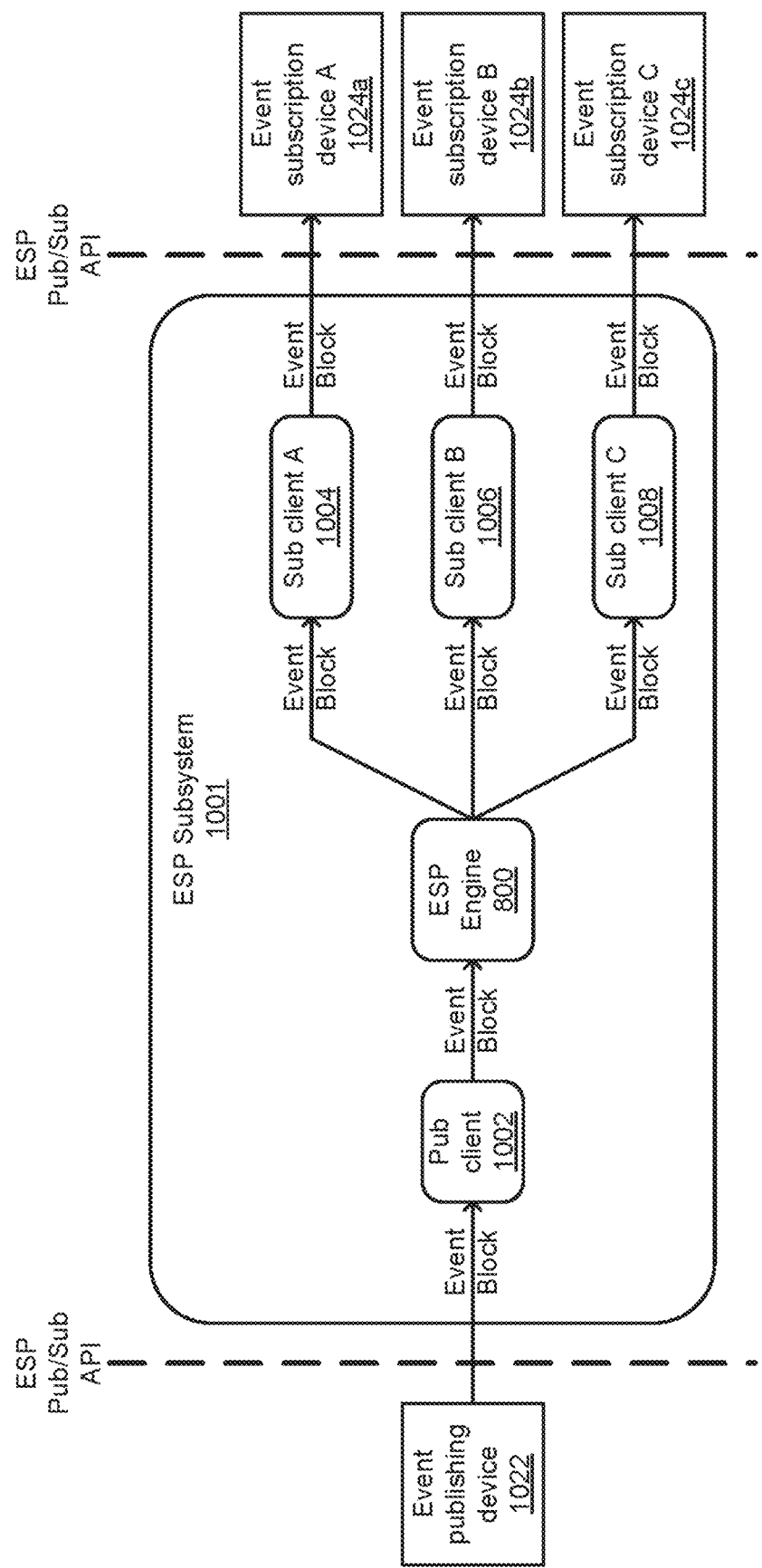
FIG. 10 illustrates an ESP system interfacing between a publishing device and multiple event subscribing devices, according to some embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more server farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® LOW Energy communication channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
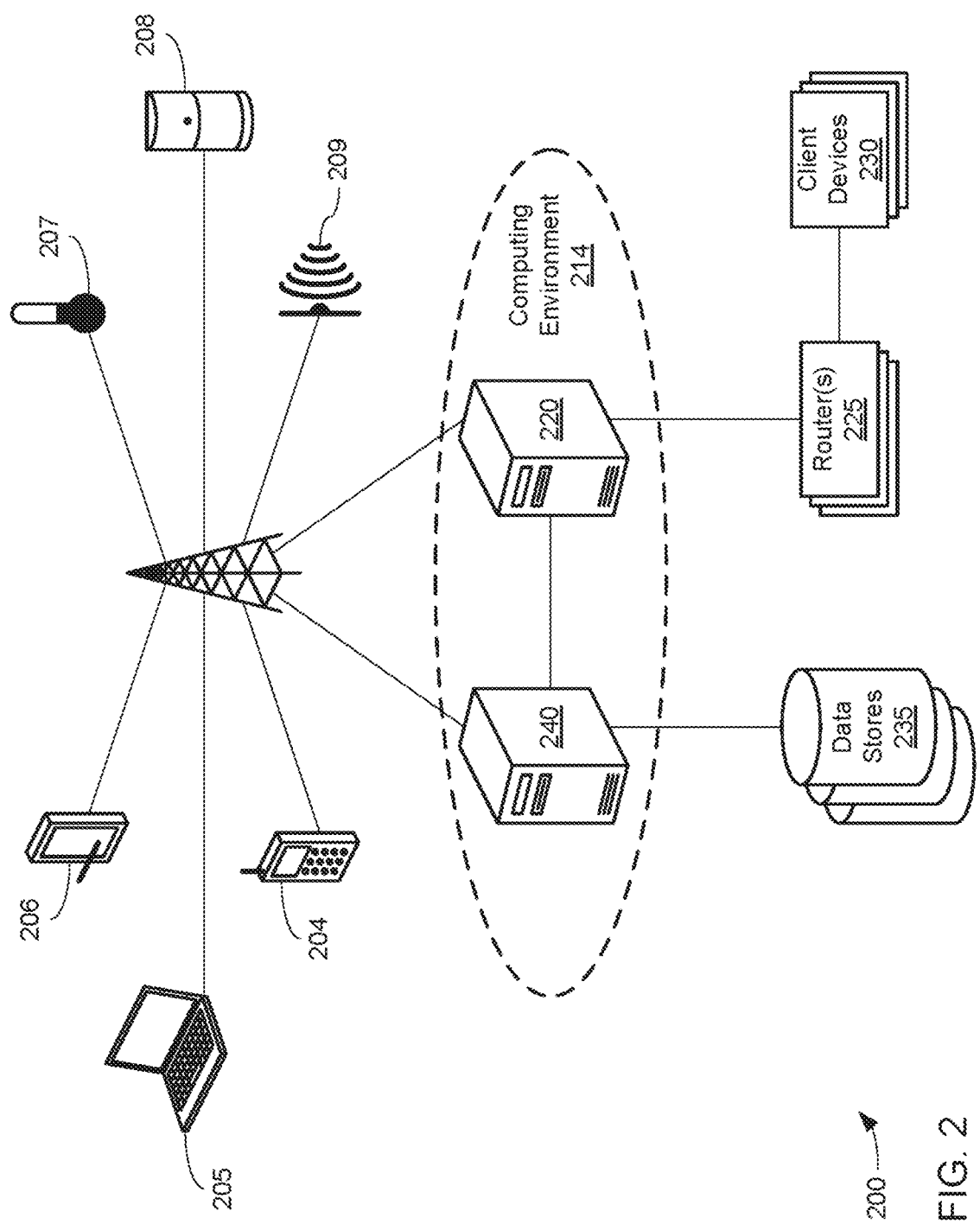
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
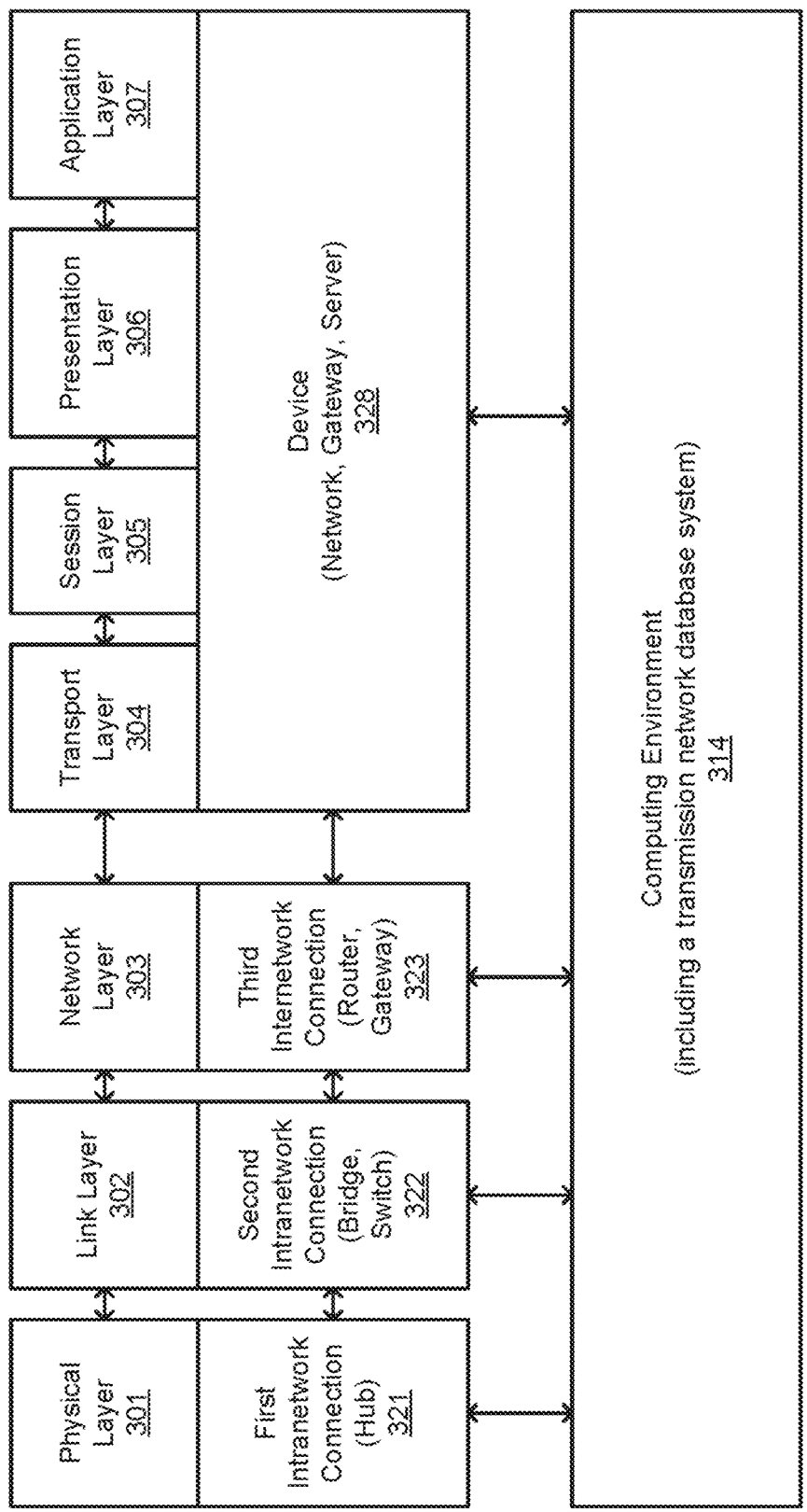
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bytes of data, and is the farthest layer from the user in a communications system. On the other hand, the application layer is the highest layer because it interacts directly with a software application.

As noted, the model includes a physical layer 301. Physical layer 301 represents physical communication and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Internetwork connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
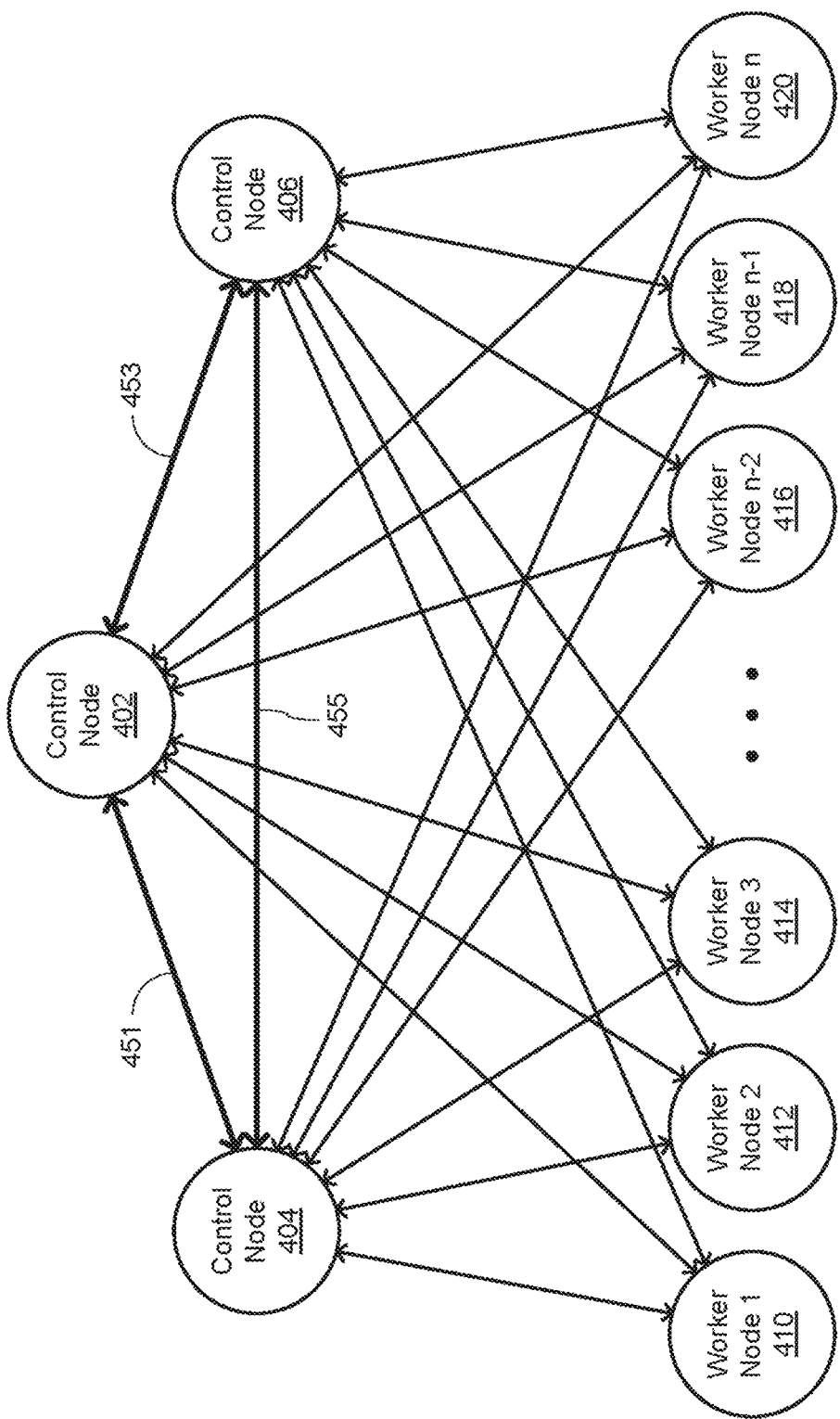
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recently saved checkpoint of their status and restart the project from that checkpoint to minimize lost progress on the project being executed.

Figure 5:
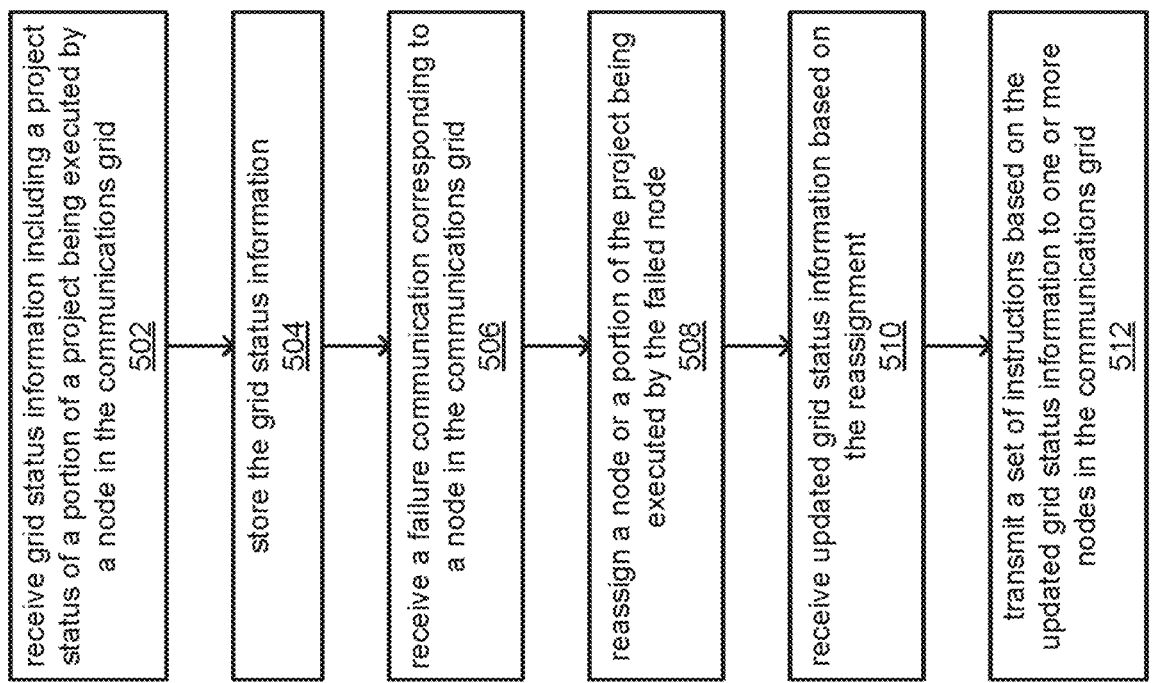
FIG. 5 illustrates a flow chart showing an example process for adjusting a communications grid or a work project in a communications grid after a failure of a node, according to some embodiments of the present technology.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
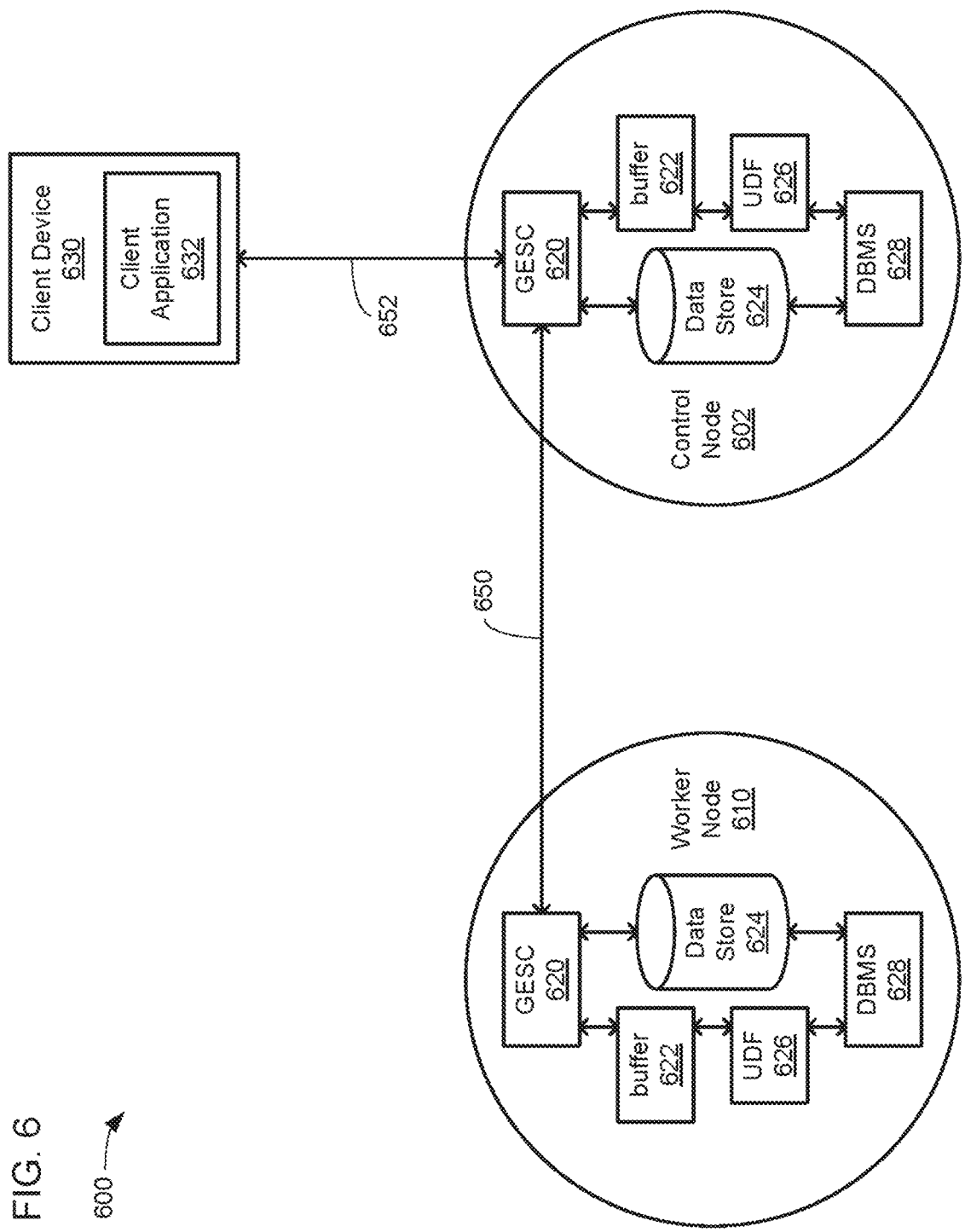
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However, in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DBMS 628 may control the creation, maintenance, and use of database or data structure (not shown) within nodes 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
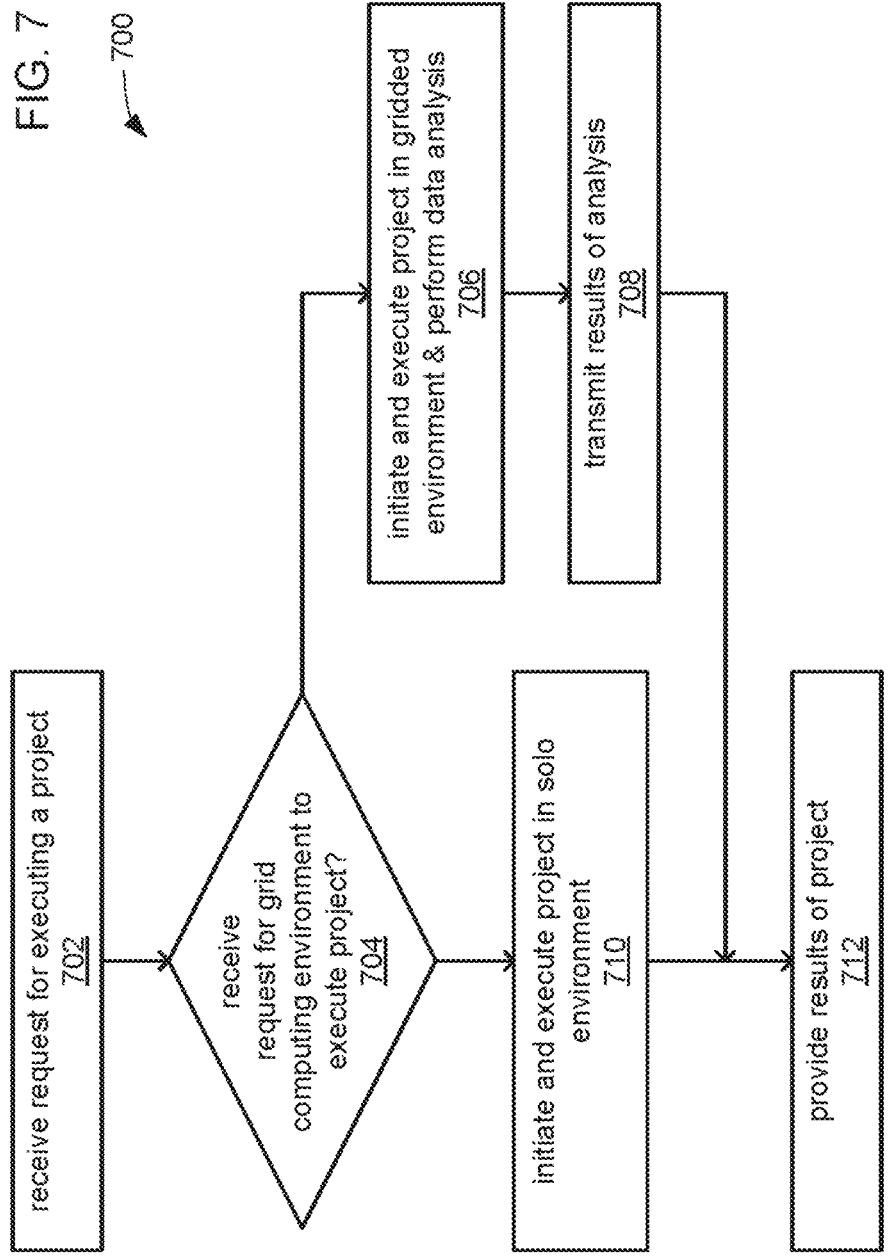
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Clients or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by one or more devices. For example, the ESPE may receive data from the one or more network devices 204-209 shown in FIG. 2. As noted, the network devices may include sensors that sense different aspects of their environments and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop-down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use the host name of an ESP device running the ESPE and the port number to establish pub/sub connections to ESPE 800.

FIG. 10 illustrates an ESP system 1000 interfacing between publishing device 1022 and event subscribing devices 1024a-c, according to embodiments of the present technology. ESP system 1000 may include ESP device or subsystem 851, event publishing device 1022, an event subscribing device A 1024a, an event subscribing device B 1024b, and an event subscribing device C 1024c. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing devices of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024a-c. For example, subscribing client A 1004, subscribing client B 1006, and subscribing client C 1008 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially data loss. The data loss can be catastrophic when the streamed data is supporting operations such as those in support of an ongoing manufacturing or drilling operation. An embodiment of an ESP system achieves a rapid and seamless failover of ESPE running at the plurality of ESP devices without service interruption or data loss, thus improving the reliability of an operational system that relies on the live or real-time processing of the data streams. The event publishing systems, the event subscribing systems, and each ESPE not executing at a failed ESP device are not aware of or affected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
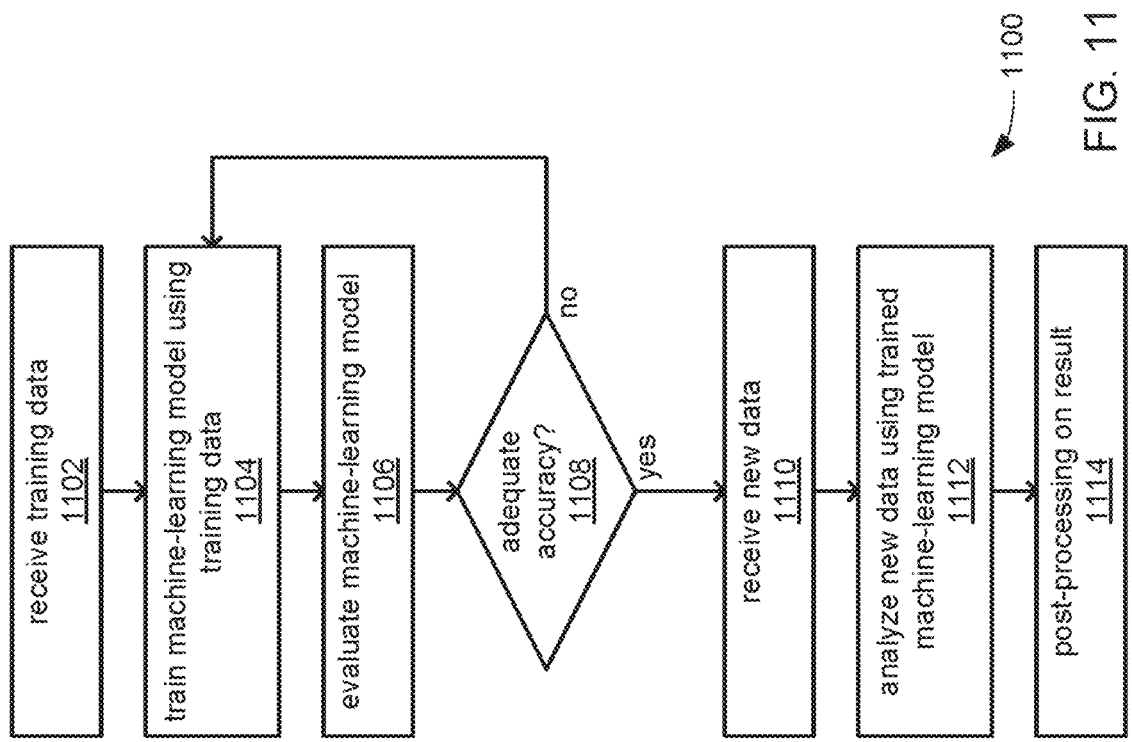
FIG. 11 illustrates a flow chart of an example of a process for generating and using a machine-learning model according to some aspects, according to some embodiments of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at 1108, the machine-learning model has an inadequate degree of accuracy for a particular task, the process can return to block 1104, where the machine-learning model can be further trained using additional training data or otherwise modified to improve accuracy. However, if, at 1108. the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
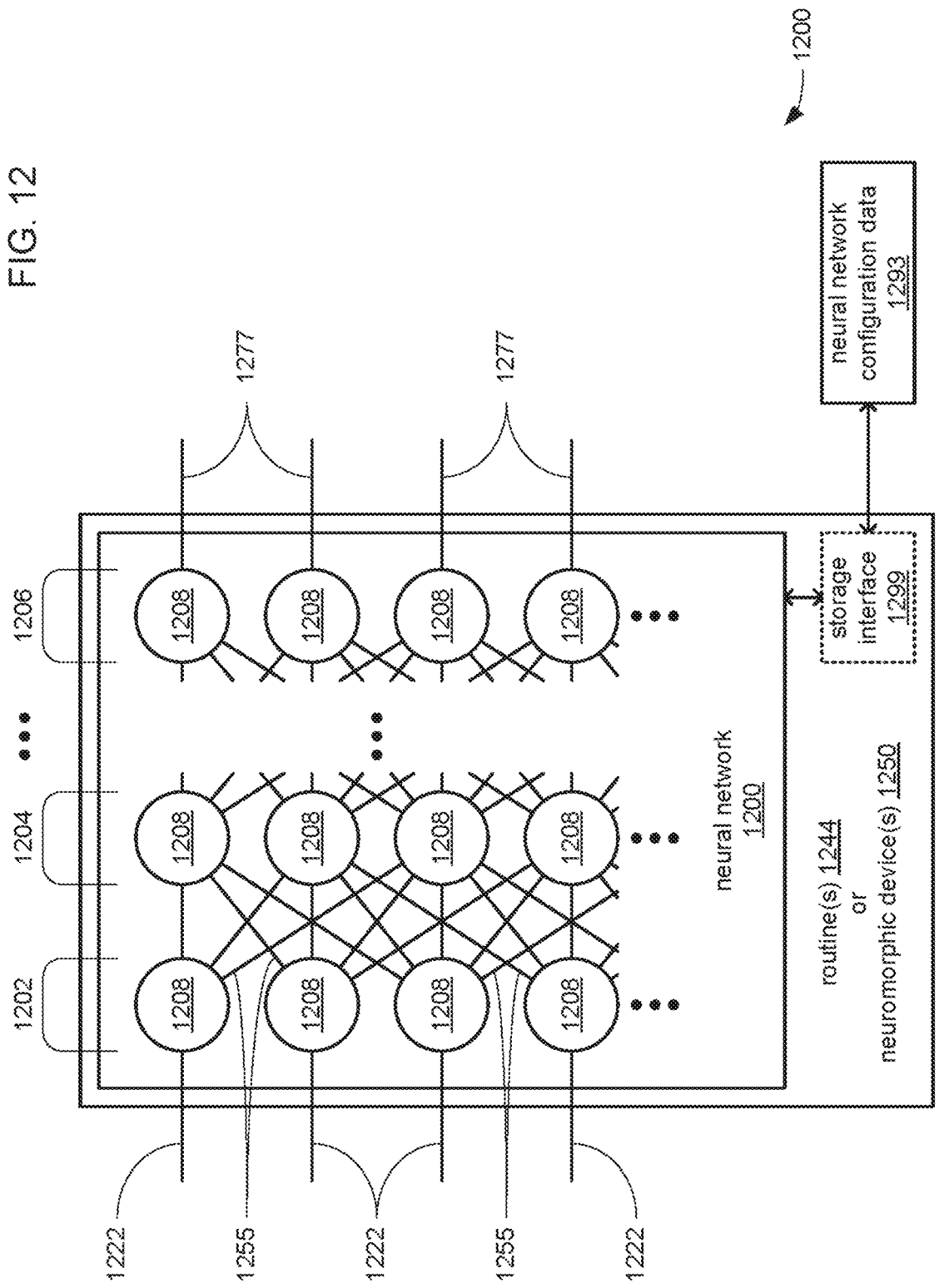
FIG. 12 illustrates an example of a machine-learning model as a neural network, according to some embodiments of the present technology.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a "forward" direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a "backward" direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y=\max(x, o)$ where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyper parameters of the neural network 1200 may be stored and/or retrieved. More specifically, the neural network configuration data 1293 may include such parameters as weighting and/or biasing values derived through the training of the neural network 1200, as has been described. Alternatively, or additionally, the neural network configuration data 1293 may include such hyperparameters as the manner in which the neurons 1208 are to be interconnected (e.g., feed-forward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network and/or a transformer model to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
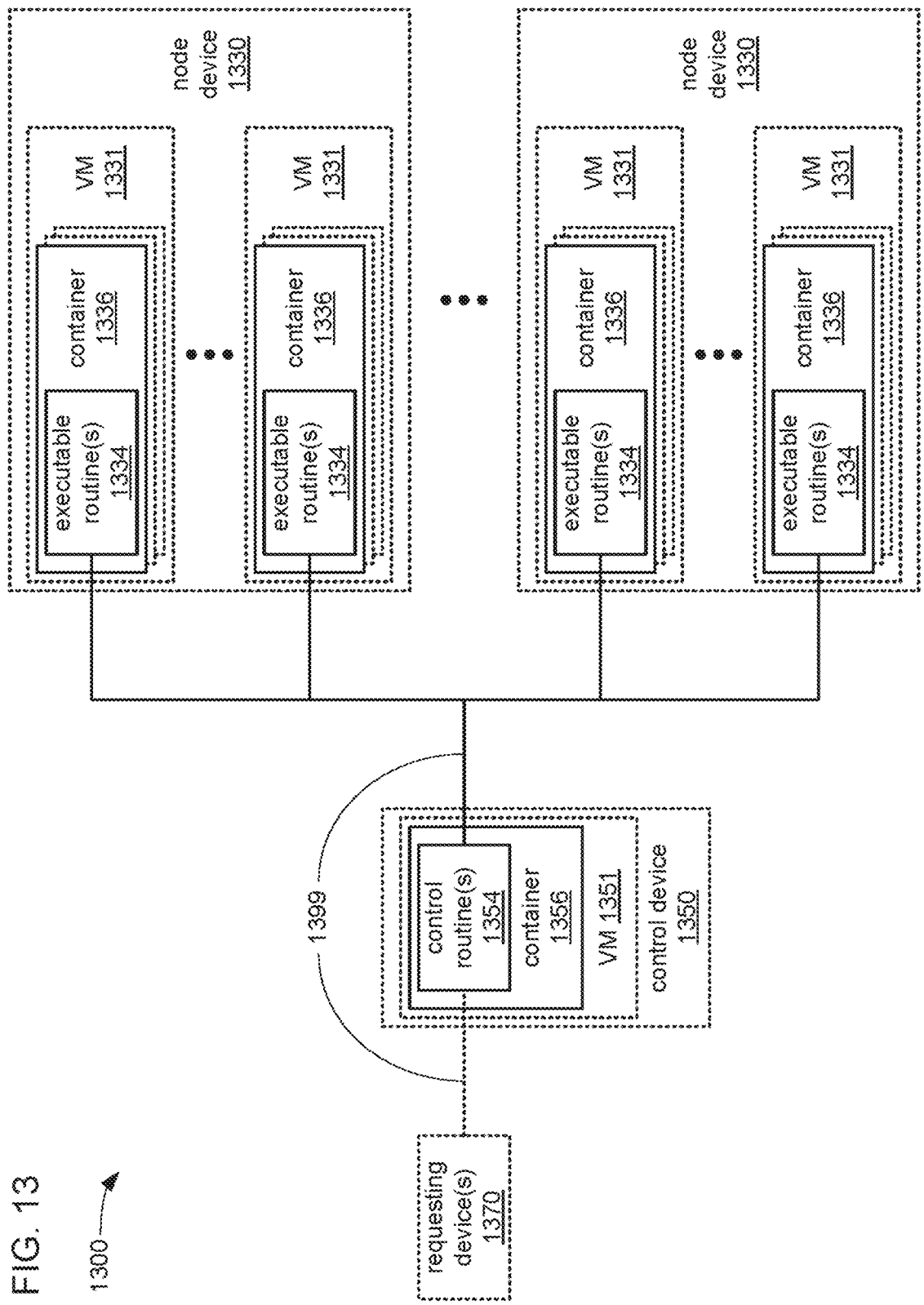
FIG. 13 illustrates various aspects of the use of containers as a mechanism to allocate processing, storage and/or other resources of a processing system to the performance of various analyses, according to some embodiments of the present technology.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the afore-described grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively, or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively, or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to effect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1300 to each VM 1331 and/or container 1336 that is instantiated therein. Thus, it may be the control device(s) 1350 that affects a nested allocation of resources, such as the aforedescribed example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions. By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies thereamong, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation and durability such that a single instance of control routine 1354 is given full control over the entirety of each such transaction to better ensure that either all of each such transaction is either entirely performed or is entirely not performed. As will be familiar to those skilled in the art, allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively, or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Cloud Native Computing Foundation of San Francisco, CA, USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively, or additionally, such supporting routines may serve to provide access to one or more storage repositories (not specifically shown) in which at least data objects may be stored for use in performing the requested analyses.

Associated Processes

Figure 14:
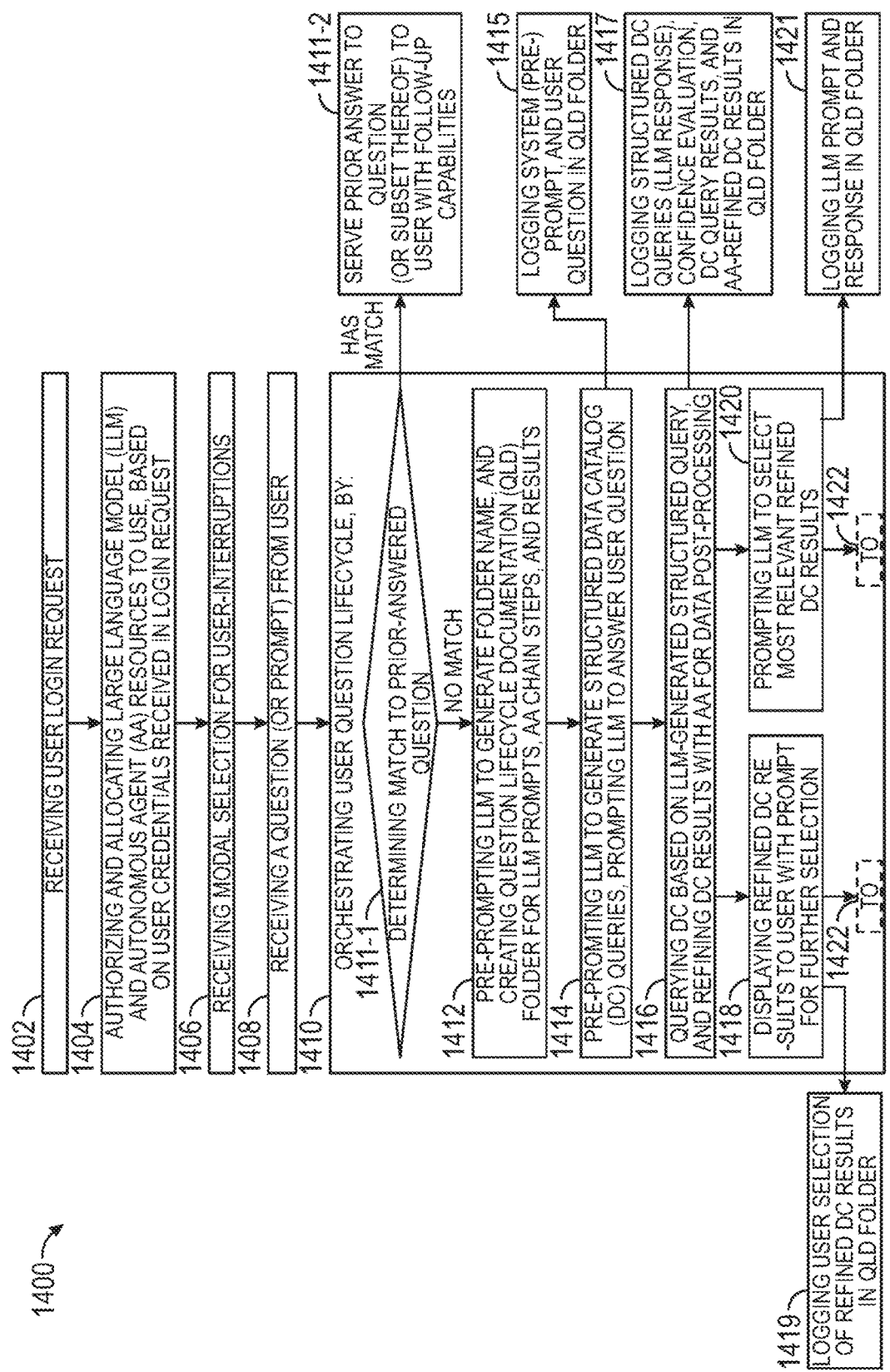
FIG. 14 illustrates an example of a method for predicting action likelihood based on linguistic patterns of a text processing model, according to some embodiments of the present technology.
Figure 14:
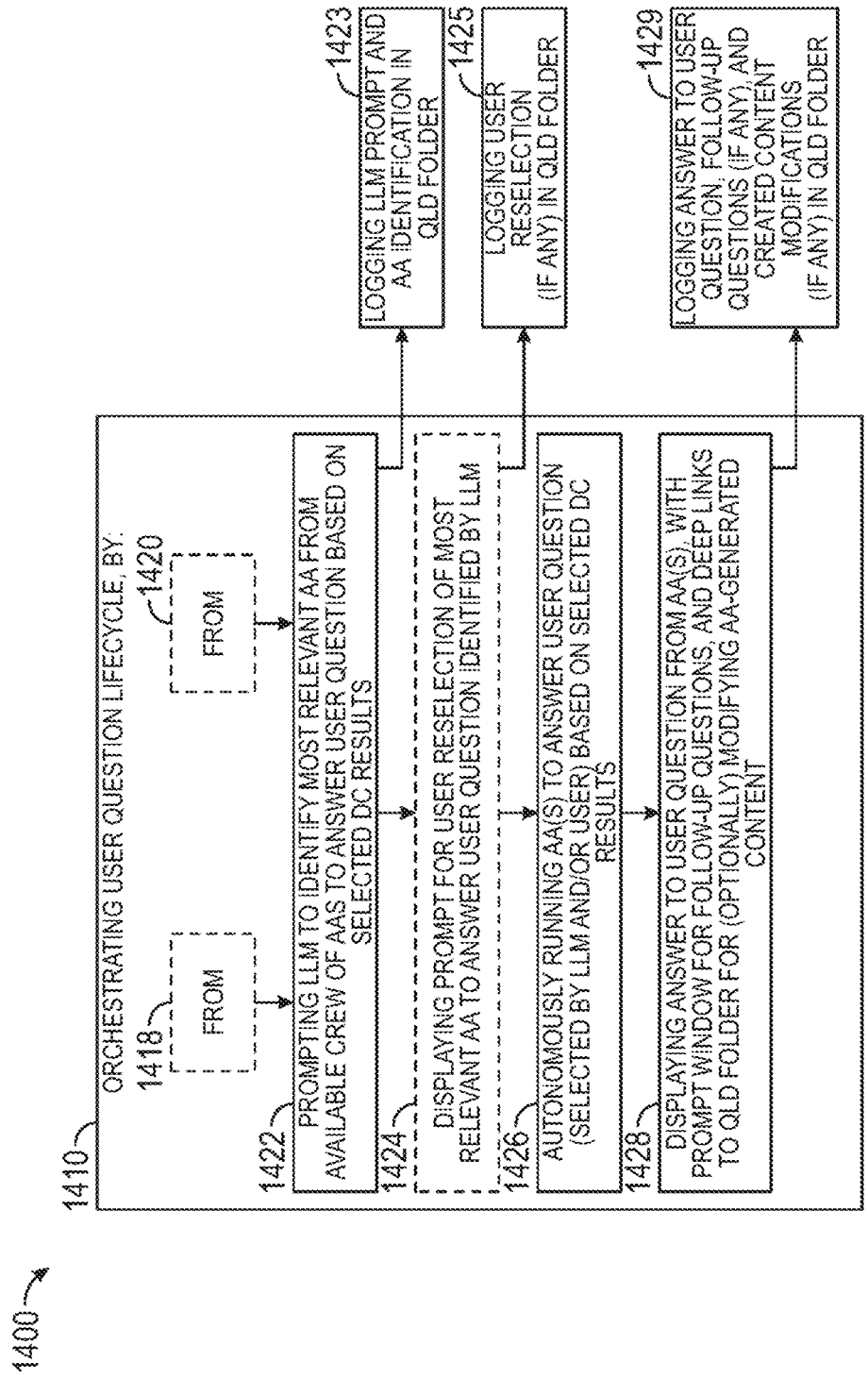

FIG. 14 illustrates one embodiment of method 1400 for securing LLM-assisted interactions with a data catalog. It shall be appreciated that other embodiments contemplated within the scope of the present disclosure may involve more processes, fewer processes, different processes, or a different order of processes than illustrated in FIG. 14. It should be noted that a computer-program product may include a non-transitory machine-readable storage medium storing computer instructions that, when executed by one or more operations, may perform operations corresponding to the processes and sub-processes of method 1400. Additionally, or alternatively, a computer-implemented method may include operations corresponding to processes and sub-processes of 1400. Additionally, or alternatively, a computer-implemented system may include one or more processors, a memory, and a computer-readable medium operably coupled to the one or more processors, the computer-readable medium having computer-readable instructions stored thereon that, when executed by the one or more processors, cause a computing device to perform operations corresponding to the processes and sub-processes of method 1400.

As will be described in more detail herein, method 1400 offers numerous technical advantages over alternative techniques. First, method 1400 enables a guided process for interacting with data catalogs that ensures that users only interact with data and execute actions that are within a defined security level for the user. For instance, a large language model (LLM) may be utilized for selecting which task of a set of predefined tasks may be performed on a table from a data catalog, where the set of predefined tasks may be limited according to the defined security level for the user. Additionally, the LLMs, data catalogs, tables within a data catalog, compound prompts, or a combination thereof that a user has access to may be limited according to a security level of the user. Such a privilege-based system may prevent users and/or the computing service executing the LLMs from accessing sensitive or confidential data within one or more computer databases or memory outside their permissions, thereby mitigating the risk of data leakage or unauthorized actions. That is, one or more embodiments, credentials associated with a user account may be used to query or search a permissions computer database or computing data structure, such as a secure permissions data table or the like. In such embodiments, a look up of the permissions computer database using the user account or the access credentials associated with the user account may render a return of specific permissions controls or permissions logic that when, executed, operate to modify control parameters of the computing service executing the LLMs. In one non-limiting example, the specific permissions controls when applied to the computing service executing the LLMs may operate to curtail, block, or restrict an ability of the computing service executing the LLMs to access one or more software application or scripts (e.g., analytical agents or the like) and/or one or more computer databases of an analytics service executing the analytical systems and methods (e.g., method 1400) described herein.

Second, method 1400 may enable generation of outputs that accurately reflect the content of the data within the data catalog. For instance, the LLM associated with the system may be limited to indicating, for the user, a set of preconfigured actions (e.g., a set of pre-configured analytical agents (AAs)) that may be performed on data. For instance, while the LLM may have access to metadata associated with a table of a data catalog, the LLM may not directly operate on the data within the table. Having AAs instead of LLMs perform tasks utilizing the data within the table may mitigate risk that the LLM may produce information about the data that fails to accurately reflect the data's content.

Figure 20:
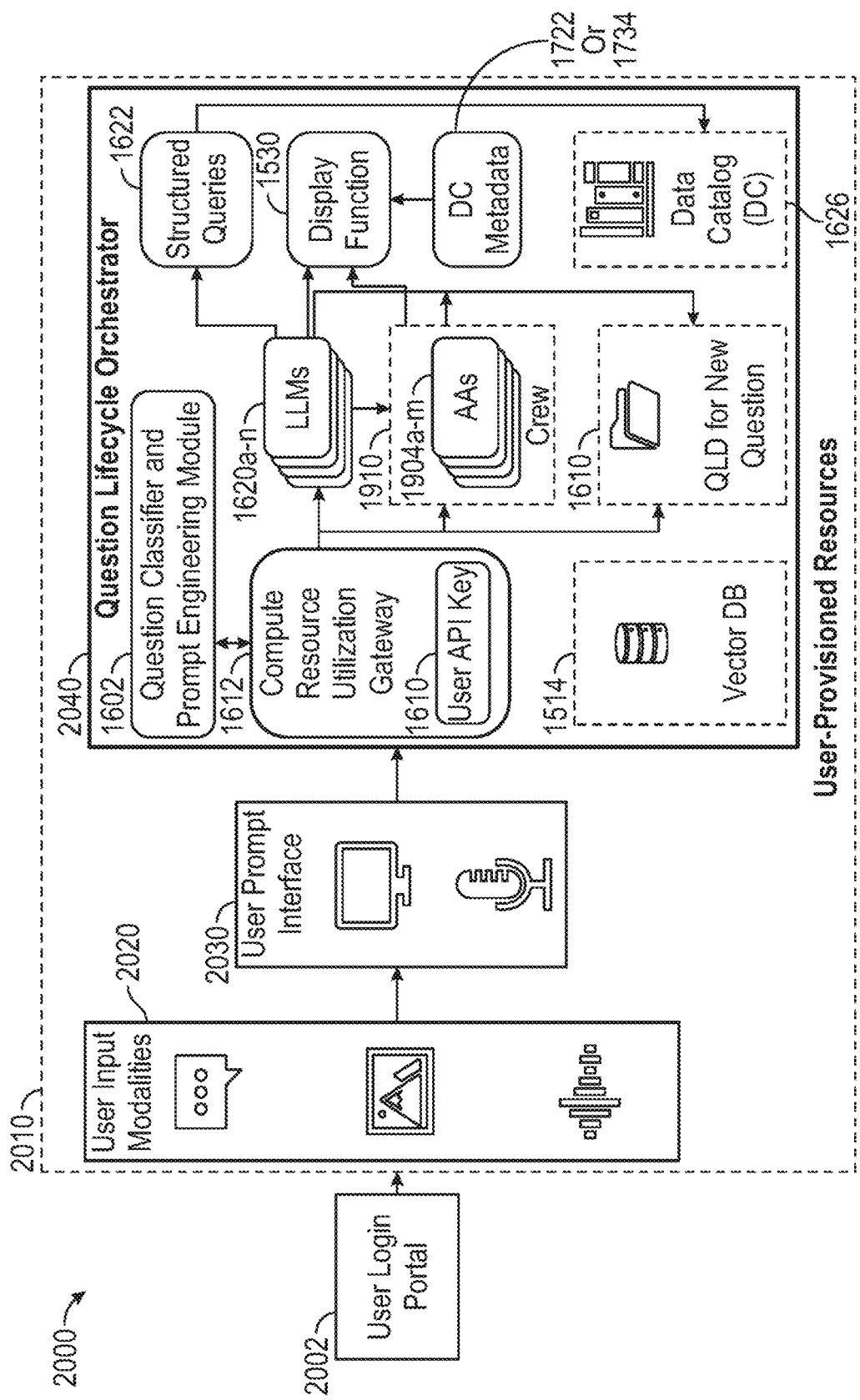
FIG. 20 illustrates an example of a system, according to some embodiments of the present technology.

As shown in FIG. 14, process 1402 of method 1400 may receive a user login request. Additionally, process 1404 of method 1400 may authorize and allocate LLM and AA resources to a user. Authorizing and allocating the LLM and AA resources may be based on user credentials received in the login request. For instance, which LLM and which agents (e.g., different functionality, such as being able to submit SQL queries or generate reports) the user is able to use may be based on the provided credentials. FIG. 20 may depict an example of a system 2000 configured to perform processes 1402 and 1404. For instance, a user may log in to the user login portal 2002 and, after being authorized by system 2000, may access user-provisioned resources 2010.

In some examples, process 1404 may selectively enable access to a subset of AAs of a set of AAs and may disable access to a different subset of AAs of the set of AAs based on authorization credentials associated with the user. Whichever AA is selected from the subset of AAs may perform an analytical task as described herein. Additionally, or alternatively, process 1404 may selectively enable access to a subset of analytical LLMs of a set of LLMs and disable access to a different subset of LLMs of the set of LLMs based on the authorization credential associated with the user. Whichever LLM is selected from the subset of LLMs may be referred to as an analytical task-oriented LLM.

Referring to FIG. 14, process 1406 of method 1400 may receive a modal selection for user-interruptions. The modal selection may be between a fully automated mode or a manual mode. The fully automated mode may run until a result is delivered to the user and may run according to one or more heuristics, metrics, or best practices. In the manual mode, the user may be prompted for additional input or to determine how the processes described herein (e.g., the sub-processes of process 1410) are to continue and/or according to which settings.

Process 1408 of method 1400 may receive a question and/or a prompt from a user. For instance, process 1408 may receive, via a user interface, a natural language query from a user for executing at least one analytical task. The question may be fed to an LLM along with a prompt to return a structured response (e.g., in JavaScript Object Notation (JSON)) containing keywords, terms, tags, and table names that may be searched through a catalog. The LLM may be prompted for a name used to create a folder that will store one or more of the generated content, results, and/or steps taken by the application or system (e.g., a question lifecycle documentation (QLD) folder as described herein).

The system of FIG. 20 may be configured to perform processes 1406 and 1408. For instance, after a user logs in to the user login portal 2002, the user may select whether the system 2000 should allow user-interruptions. Additionally, the user may select a user input modality (e.g., keyboard, microphone) from one or more user input modalities 2020 and may provide the question or prompt to user prompt interface 2030 via the chosen user input modality.

Figure 21:
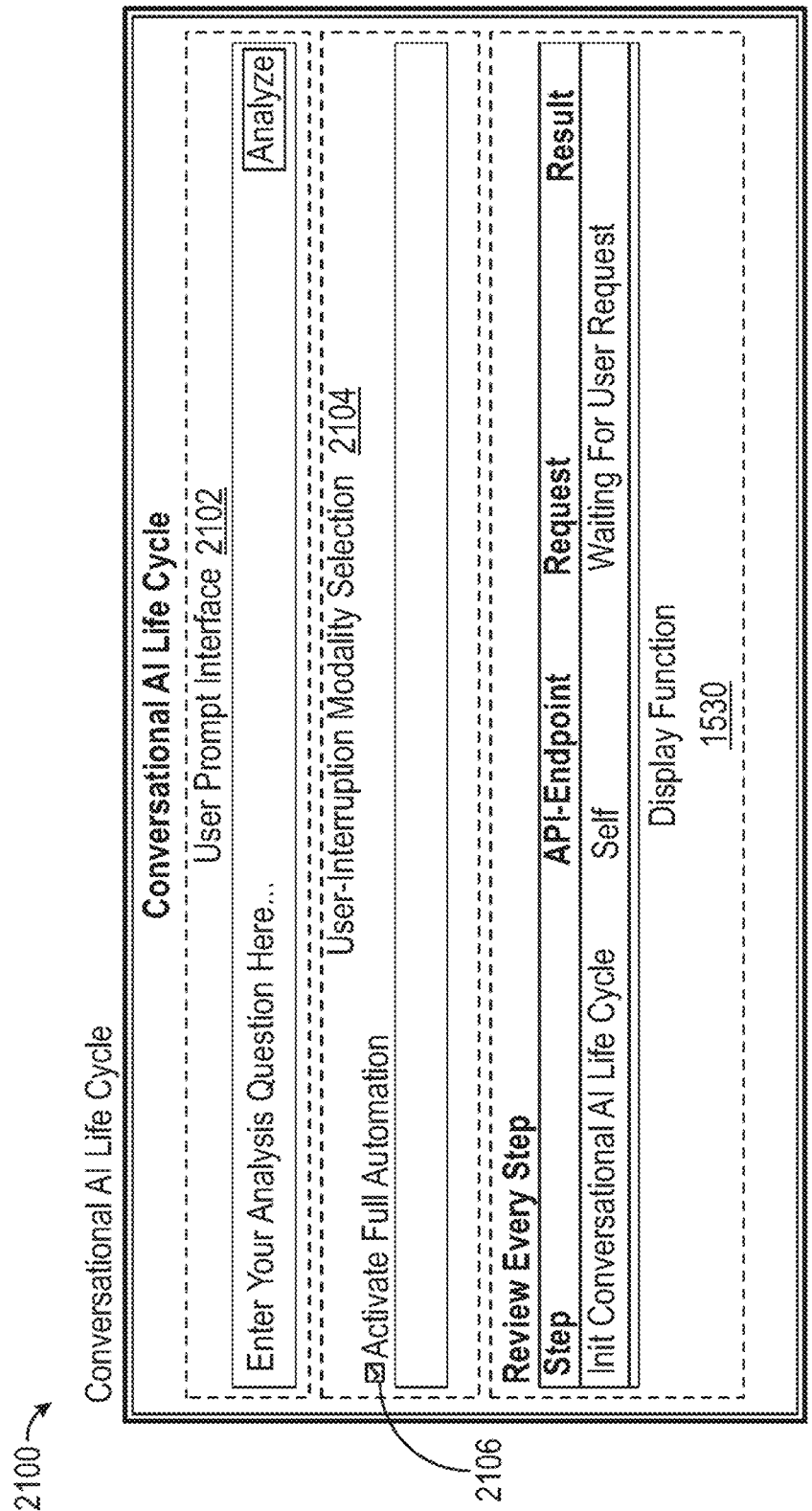
FIGS. 21-26 illustrate examples of graphical user interfaces (GUIs), according to some embodiments of the present technology.

General user interface (GUI) 2100 of FIG. 21 may illustrate a non-limiting example of a user interface (UI) for interacting with system 2000 of FIG. 20 to perform processes 1406 and 1408. For instance, user prompt interface 2102 may be an example of user prompt interface 2030. Interacting with GUI 2100 may include entering a question or prompt into user prompt interface 2102, such as described at process 1408. Additionally, interacting with GUI 2100 may include performing user-interruption modality selection 2104 (e.g., activating full automation), such as described at process 1406. For instance, GUI 2100 may include a UI control element 2106 (e.g., a selector) configured to receive an input indicating whether full automation should be activated. If the UI control element 2106 receives an input indicating that full automation should be disabled, a user may be given one or more opportunities throughout process 1410 to provide further input that may affect a flow of process 1410 (e.g., a user performing selection among refined DC results at sub-process 1418 as described herein instead of the LLM performing the selection, such as at sub-process 1420).

GUI 2100 may also include a display function 1530 for displaying information relevant to the GUI interaction. For instance, when a user pulls up GUI 2100, the display function 1530 may indicate that the user prompt interface 2102 is waiting for a user request and/or that a conversational AI life cycle has been initiated, where the corresponding API endpoint may be self-directed (e.g., may correspond to the device hosting the GUI 2100). It should be noted that, in some examples, GUIs 2100, 2200, 2300, 2400, 2500, and 2600 may represent views of the same GUI at different stages of a user question lifecycle orchestration.

Referring to FIG. 14, process 1410 of method 1400 may orchestrate a user question lifecycle. Initiating the user question lifecycle may include process 1410 generating an analytical LLM prompt for an analytical task-oriented LLM based on the natural language query received at process 1408 followed by orchestrating an LLM-directed workflow for handling the natural language query. Question lifecycle orchestrator 2040 of FIG. 20 may be configured to perform process 1410. For instance, compute resource utilization gateway 1612 may receive a query or prompt from the user (e.g., a natural language query using text, audio, a translated image, translated video, or a combination thereof) via user prompt interface 2030 along with a user API key 1610 (e.g., to confirm an identity of the user) and may provide the query or prompt to question classifier and prompt engineering module 1602. Question classifier and prompt engineering module 1602 may generate the analytical LLM prompt.

Process 1410 may include a sub-process 1411-1 that may determine whether a match to a prior-answered question (e.g., a question similar to or the same as a previously input prompt or query) has occurred. If a match has occurred, sub-process 1411-1 may proceed to process 1411-2 of method 1400. If there is no match (e.g., if a match has not occurred), sub-process 1411-1 may proceed to sub-process 1412 of process 1410. In some examples, a vector encoder converts the natural language query to a vector representation and assesses the vector representation of the natural language query against a set of vector representations of historical analytical responses to historical natural language queries that are stored within a computer database associated with the analytical service. For instance, sub-process 1411-1 may identify a match between the vector representation of the natural language query and at least one vector representation of a historical analytical response from the computer database and may bypass a generation of a new output response to the natural language query based on the match between the vector representation of the natural language query and the at least one vector representation of a historical analytical response, where the output response includes the historical analytical response. In some examples, system 2000 may be configured to perform sub-process 1411-1. For instance, question lifecycle orchestrator 2040 may attempt to identify a match between a vector representation of a query received from user prompt interface 2030 and at least one vector representation of a historical analytical response from vector database 1514. Referring to FIG. 14, process 1411-2 of method 1400 may serve a prior answer to the received question (or a subset thereof) to the user with follow-up capabilities.

Figure 15:
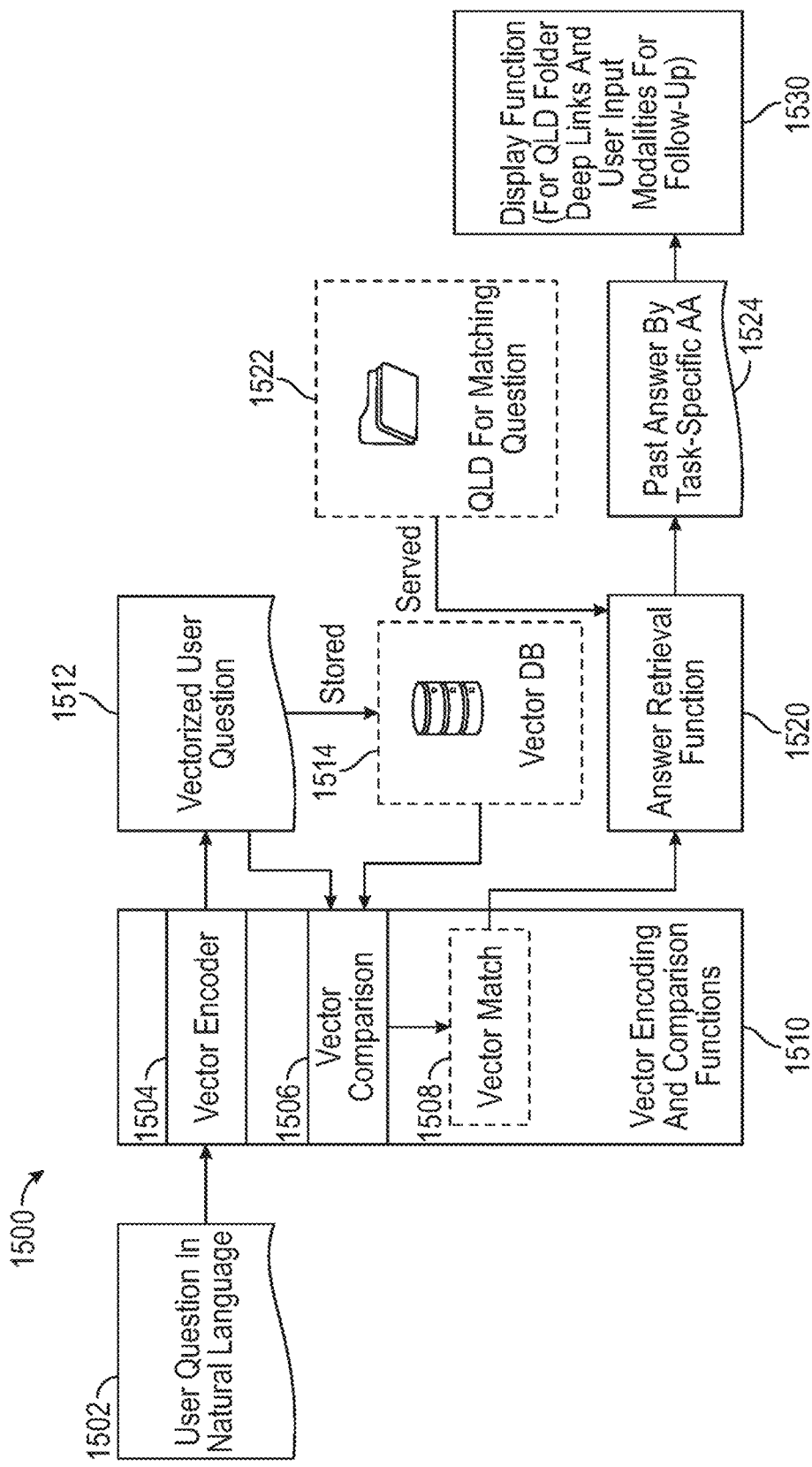
FIG. 15 illustrates an example of an answer retrieval mechanism, according to some embodiments of the present technology.
Figure 16:
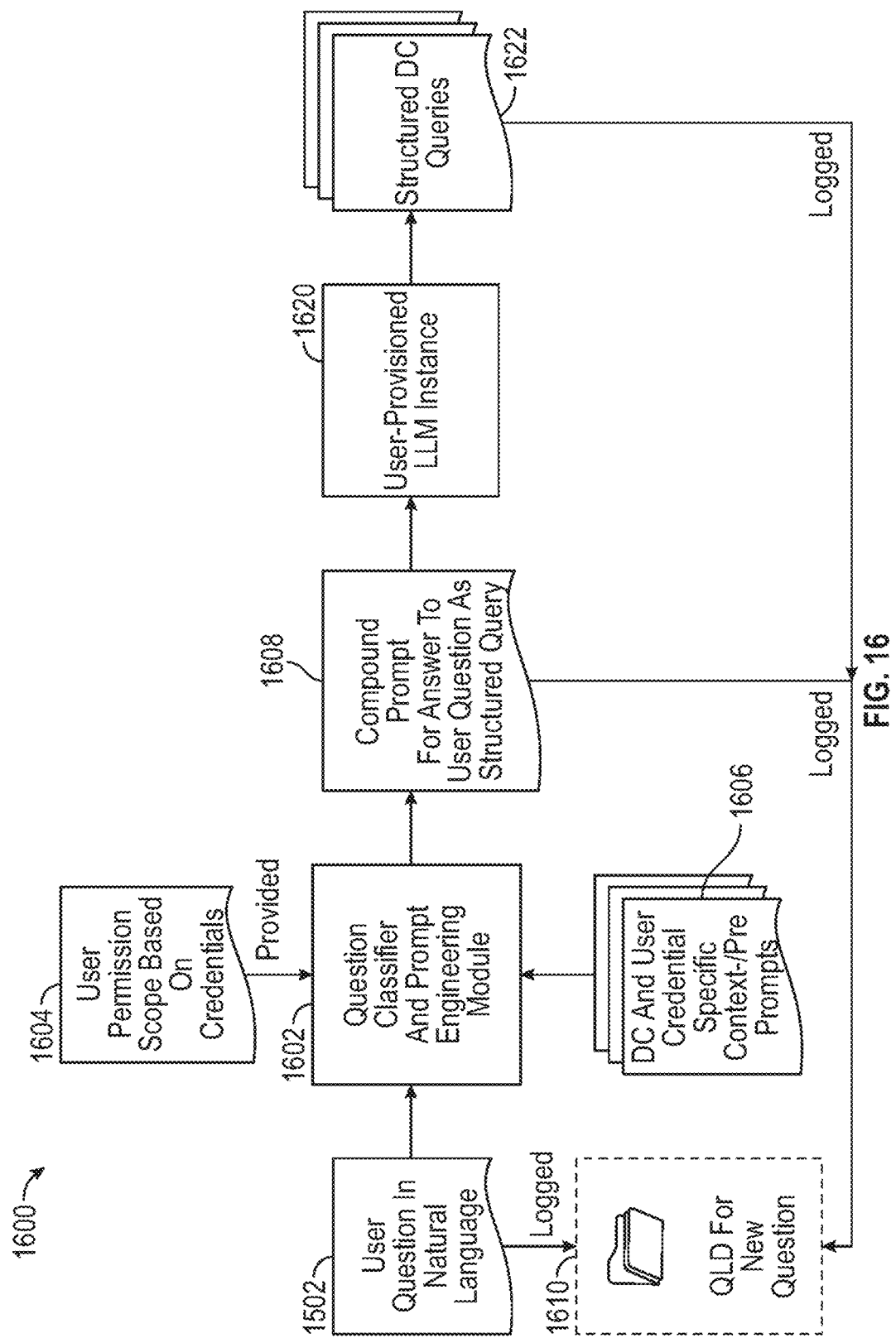
FIG. 16 illustrates an example of a structured query generation mechanism, according to some embodiments of the present technology.
Figure 17:
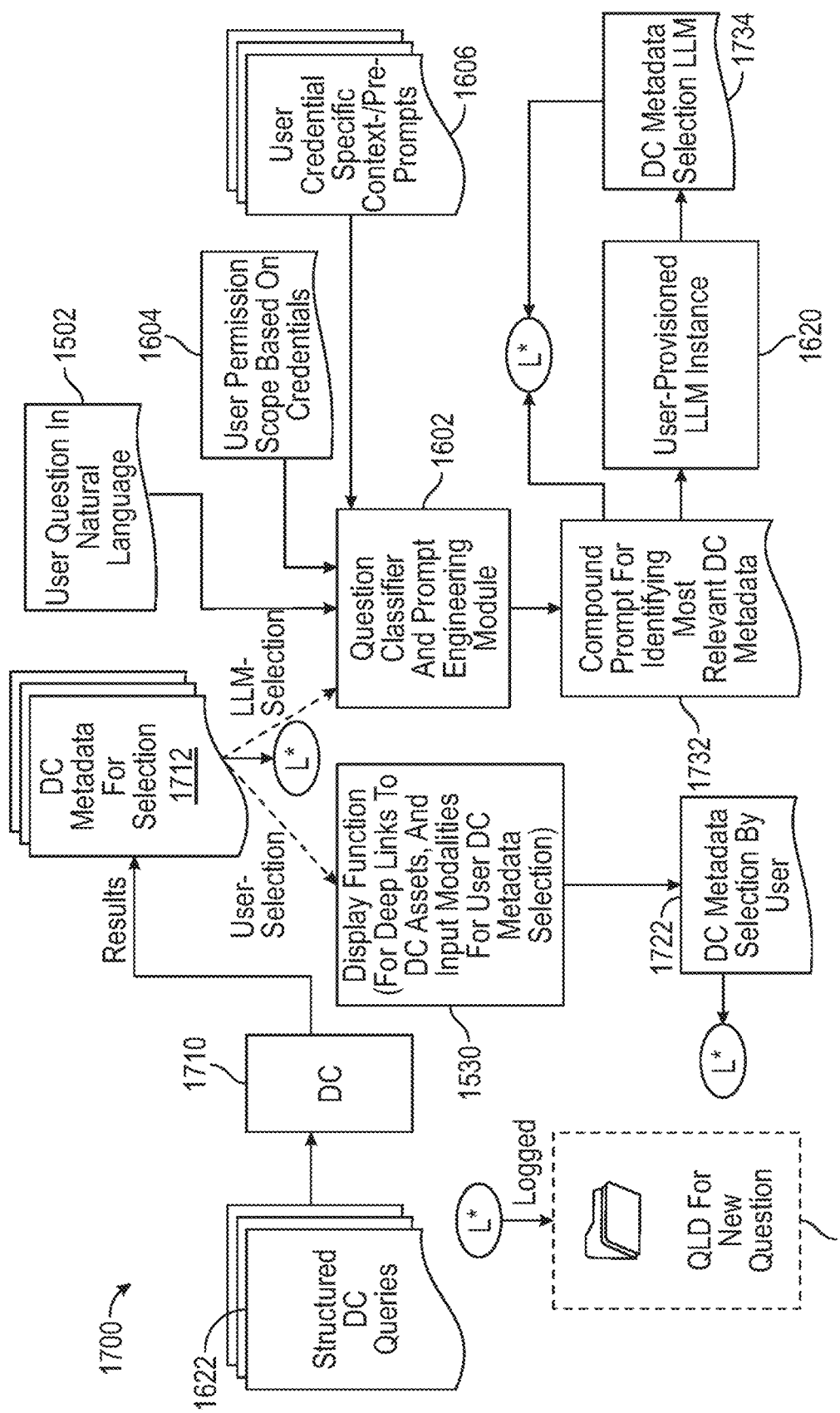
FIG. 17 illustrates an example of a data catalog metadata selection mechanism, according to some embodiments of the present technology.

Answer retrieval mechanism 1500 of FIG. 15 may represent a non-limiting example of processes 1408 and 1410 as well as sub-processes 1411-1 and 1411-2 of FIG. 14. For instance, a user question in a natural language 1502 may be received and may be encoded into a vectorized user question 1512 via vector encoder 1504 of vector encoding and comparison functions 1510. The vectorized user question 1512 may be compared with a vector retrieved from vector database 1514 and associated with a historical analytical response via vector comparison 1506 of vector encoding and comparison functions 1510. Additionally, the vectorized user question may be stored at vector database 1514 for future comparisons. If a vector match 1508 is confirmed by the vector comparison 1506, an answer retrieval function 1520 may retrieve the historical analytical response (e.g., a past answer 1524 from an AA) from a question lifecycle documentation (QLD) folder 1522. The historical analytical response may be an example of a past-answer by a task-specific AA. After receiving the historical analytical response, display function 1530 may be activated, where display function 1530 may display information about the historical analytical response, deep links associated with the QLD folder, user input modalities for follow-up, or a combination thereof.

Referring to FIG. 14, sub-process 1412 of process 1410 may pre-prompt the LLM to generate a folder name and may create a question lifecycle documentation (QLD) folder for LLM prompts, AA chain steps, results, and/or a combination thereof.

Referring to FIG. 14, sub-process 1414 of process 1410 may pre-prompt an analytical task-oriented LLM to generate structured data catalog (DC) queries, which may prompt the LLM to answer the query or prompt received from the user (e.g., the user question). For instance, sub-process 1414 may automatically prompt, using the analytical LLM prompt generated at process 1410, an analytical task-oriented LLM to generate at least one structured query for querying a DC application. The at least one structured query may include a structured request relating to the at least one analytical task associated with the natural language query. In some examples, the DC application stores and manages metadata corresponding to diverse data sources and the at least one structured query generated by the analytical task-oriented LLM includes one or more query parameters configured based on a metadata schema of the DC application. Sub-process 1414 may proceed to process 1415 of method 1400 and/or sub-process 1416 of process 1410.

Referring to FIG. 14, process 1415 of method 1400 may log a system prompt (or pre-prompt) and/or a user question in the QLD folder.

Structured query generation mechanism 1600 may represent a non-limiting example of generating one or more structured DC queries according to processes 1408 and 1410 as well as one or more of sub-processes 1411-1, 1412, 1414, and 1415. For instance, a user question 1502 (e.g., a user question in a natural language) may be received and logged in a QLD folder (e.g., a QLD folder 1610). Additionally, the user question 1502 may be provided to question classifier and prompt engineering module 1602. Additionally, question classifier and prompt engineering module 1602 may receive user permission scope 1604 (e.g., an API key or another identifier indicating an authorization level of the user) based on credentials as well as one or more DC and user credential specific context-prompts and/or pre-prompts 1606. The question classifier and prompt engineering module 1602 may generate a compound prompt 1608 (e.g., for answer to user question as a structured query), which may be logged at the QLD folder 1610. Additionally, the compound prompt 1608 may be provided to a user-provisioned LLM instance 1620 that may generate one or more associated structured DC queries 1622. The one or more associated structured DC queries 1622 may be logged at QLD folder 1610.

Figure 22:
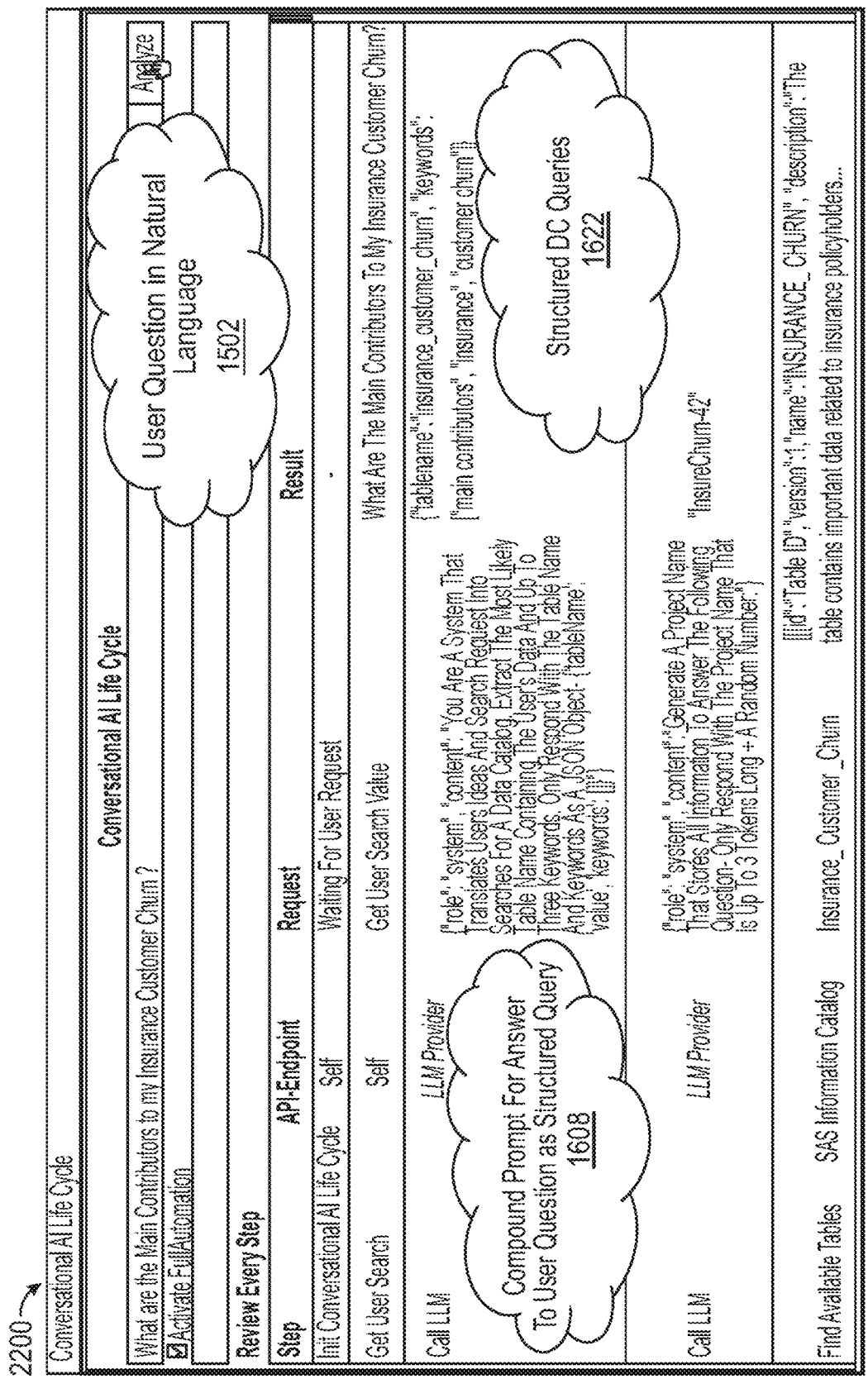

GUI 2200 of FIG. 22 may illustrate a non-limiting example of a UI interacting with system 2000 of FIG. 20 to perform the techniques of structured query generation mechanism 1600 and/or processes 1408 and 1410 as well as one or more of sub-processes 1411-1, 1412, 1414, and 1415 of FIG. 14. For instance, when a user question in a natural language 1502 is input into a user prompt interface (e.g., user prompt interface 2030, user prompt interface 2102), the computer resource utilization gateway 1612 may provide an associated compound prompt (compound prompt 1608) to LLMs 1620a-n of FIG. 20, which may be displayed via display function 1530. For instance, when the user submits the user question in a natural language 1502 (e.g., via the analyze button), the display function 1530 may indicate that it is attempting to get a user search value, where the corresponding API endpoint may be self-directed (e.g., may correspond to the device or system hosting the GUI 2200). The display function 1530 may display the result of attempting to get the user search value, which may for instance be the user question in the natural language 1502 (e.g., "What are the main contributors to my insurance customer churn?"). After getting the user search value, the (e.g., one or more of LLMs 1620a-n), the system hosting GUI 2200 may call an API endpoint associated with an LLM provider. Calling the API endpoint may include generating a compound prompt 1608 associated with the user question in a natural language 1502 and providing the compound prompt 1608 to the API endpoint. The compound prompt 1608 may be provided to the API endpoint along with an indication of the user question in the natural language 1502. Additionally, the compound prompt 1608 may be displayed via display function 1530.

In some examples, generating compound prompt 1608, which may also be referred to as a technical prompt, may include a conversion of the user question in a natural language 1502 into the compound prompt. Such a conversion may include converting the user question into one or more embeddings or vectors and mapping the one or more embeddings or vectors into a constrained N-dimensional space including a set of N distinct vectors, where each vector corresponds to a unique compound prompt. The compound prompt 1608 that is utilized may be selected from a set of compound prompts corresponding to the set of N distinct vectors. The conversion may be performed utilizing a reference bank (e.g., via a question-answering (QA) model) or according to other machine learning techniques. In some examples, the conversion process may return multiple compound prompts that a user may select among or that may be provided together to an LLM for generation of a structured DC query.

In a non-limiting example, the compound prompt 1608 may indicate, to the LLM, that it is a system for translating user's ideas and search requests into a search for a data catalog and that it should return a table name and keywords as a JSON object (e.g., "{"role": "system", "content":" You are a system that translates user ideas and search request into searches for a data catalog. Extract the most likely table name containing the user's data and up to three keywords. Only respond with the table name and keywords as a JSON object-{"tableName": "value", "keywords": [ ]}"). Upon receiving the compound prompt 1608, the LLM provider may return a corresponding result that is a structured DC query 1622. In a non-limiting example, the result may include a table name and keywords as a JSON object (e.g., {"tableName": "insurance_customer_churn", "keywords": ["main contributors", "insurance", "customer churn"]}). The structured DC query 1622 may be displayed via display function 1530.

After receiving the structured DC query 1622, the system hosting GUI 2200 may attempt to find available tables by calling an API endpoint associated with a DC (e.g., SAS information catalog) and providing the structured DC query 1622 to the called API endpoint. In some examples, the LLM that generates the structured DC query 1622 may provide back a generated API function call that is routed to the API endpoint associated with the DC. Routing may include providing a message associated with the generated API function call to the API endpoint associated with the DC. As a non-limiting example, first signaling including an indication of an analytical LLM prompt (e.g., a user question in a natural language 1502) may be provided by a system hosting GUI 2200 to a first API endpoint and second signaling that includes a message for an API function call may be received from the first API endpoint by the system. The message may include an indication of at least one structured DC query and the DC may be queried by routing the API function call to a second API endpoint associated with the DC. Additionally, or alternatively, the structured DC query 1622 may be provided in a JSON format or as content that may be converted into a JSON format and the corresponding structured DC query 1622 may be provided to the API endpoint in the JSON format.

In some examples, the system hosting GUI 2200 may call an API endpoint associated with an LLM provider to generate a project name that stores information to answer a particular user question (e.g., user question in a natural language 1502). For instance, the system may provide a compound prompt (e.g., {"role": "system", "content": "Generate a project name that stores all information to answer the following question-only respond with the project name that is up to 3 tokens long+a random number."} to the API and may receive a response corresponding to the project name (e.g., InsureChum-42."

The associated command prompt may be displayed on GUI 2200 (e.g., in the request column) via display function 1530. LLMs 1620a-n may generate one or more structured DC queries (e.g., structured DC queries) from the command prompt. The associated one or more structured DC queries may be displayed on GUI 2200 (e.g., in the result column) via display function 1530. Additionally, the command prompt and the associated one or more structured queries may be logged at QLD folder 1610.

In some examples, process 1410 may classify, by a question classification model (e.g., via question classifier and prompt engineering module 1602), the query or prompt (e.g., the natural language query using text, audio, an image, video, or a mixed-modality combination thereof) to at least a first given query type of a set of distinct query types and, in response to the classification of the query or prompt, may map the first given query type associated with the query or prompt to a first analytical LLM prompt of a set of distinct analytical LLM prompts designed for the analytical task-oriented LLM. Process 1410 may also generate the analytical prompt based on the first analytical LLM prompt. Additionally, generating the analytical LLM prompt based on the natural language query may include classifying, by the question classification model, the natural language query to at least a second given query type of a set of distinct query types and, in response to the classification of the natural language query, mapping the second given query type associated with the natural language query to a second analytical LLM prompt of the set of distinct analytical LLM prompts designed for the analytical task-oriented LLM. Additionally, or alternatively, process 1410 may generate the analytical prompt based on the first analytical LLM prompt and the second analytical LLM prompt, where the analytical prompt includes a compound analytical LLM prompt that converges the first analytical LLM prompt and the second analytical LLM prompt into a single prompt input to the analytical task-oriented LLM.

In some examples, the analytical task-oriented LLM may parse the natural language query into distinct query components, where each distinct query component corresponds to a different aspect of a metadata schema of the data catalog application and the analytical task-oriented LLM constructs a multi-part structured query based on the distinct query components of the natural language query.

Referring to FIG. 14, sub-process 1416 of process 1410 may query the DC based on an AA or LLM-generated structured query and may refine DC results with AA for data post-processing. For instance, sub-process 1416 may query the DC application using the at least one structured query generated by the analytical task-oriented LLM. The DC may return matching results based on connected tables that have been indexed by it, which may enable the application and/or system to avoid returning misrepresented information (e.g., hallucinations). In examples in which the natural language query is a natural language analytical request, generating the at least one structured query may include transforming by the analytical task-oriented LLM, the natural language analytical request to the at least one structured query based on query structures associated with the data catalog application. Additionally, or alternatively, the performing operations may further include translating, by the analytical task-oriented LLM, the natural language analytical request to a set of structured queries, the set of structured queries having query structures associated with the data catalog application. Sub-process 1416 may proceed to process 1417 of method 1400, sub-process 1418 of process 1410, sub-process 1420 of process 1410, or a combination thereof.

Referring to FIG. 14, process 1417 of method 1400 may log structured DC queries (e.g., LLM response), confidence evaluation, DC query results, AA-refined DC results, or a combination thereof in the QLD folder.

Referring to FIG. 14, sub-process 1418 of process 1410 may display refined DC results to the user with a prompt for further selection. For instance, sub-process 1418 may obtain query results from the DC application in response to the at least one structured query, where the query may include metadata associated with at least one element accessible to the DC application. The return results may be aggregated, deduplicated, and cleaned before being displayed to the user. If the user selects manual mode (e.g., at 1406), the user may be prompted to select one of the tables. In automatic mode (e.g., sub-process 1420), the LLM is prompted with the list of tables, their columns, the column labels, and the scaling of each column (e.g., interval, nominal, binary), each provided to a DC, to identify the table more likely to answer a user's question. Sub-process 1418 may proceed to process 1419 of method 1400 and/or sub-process 1422 of process 1410. Process 1419 of method 1400 may log user-selection of refined DC results in the QLD folder.

Figure 23:
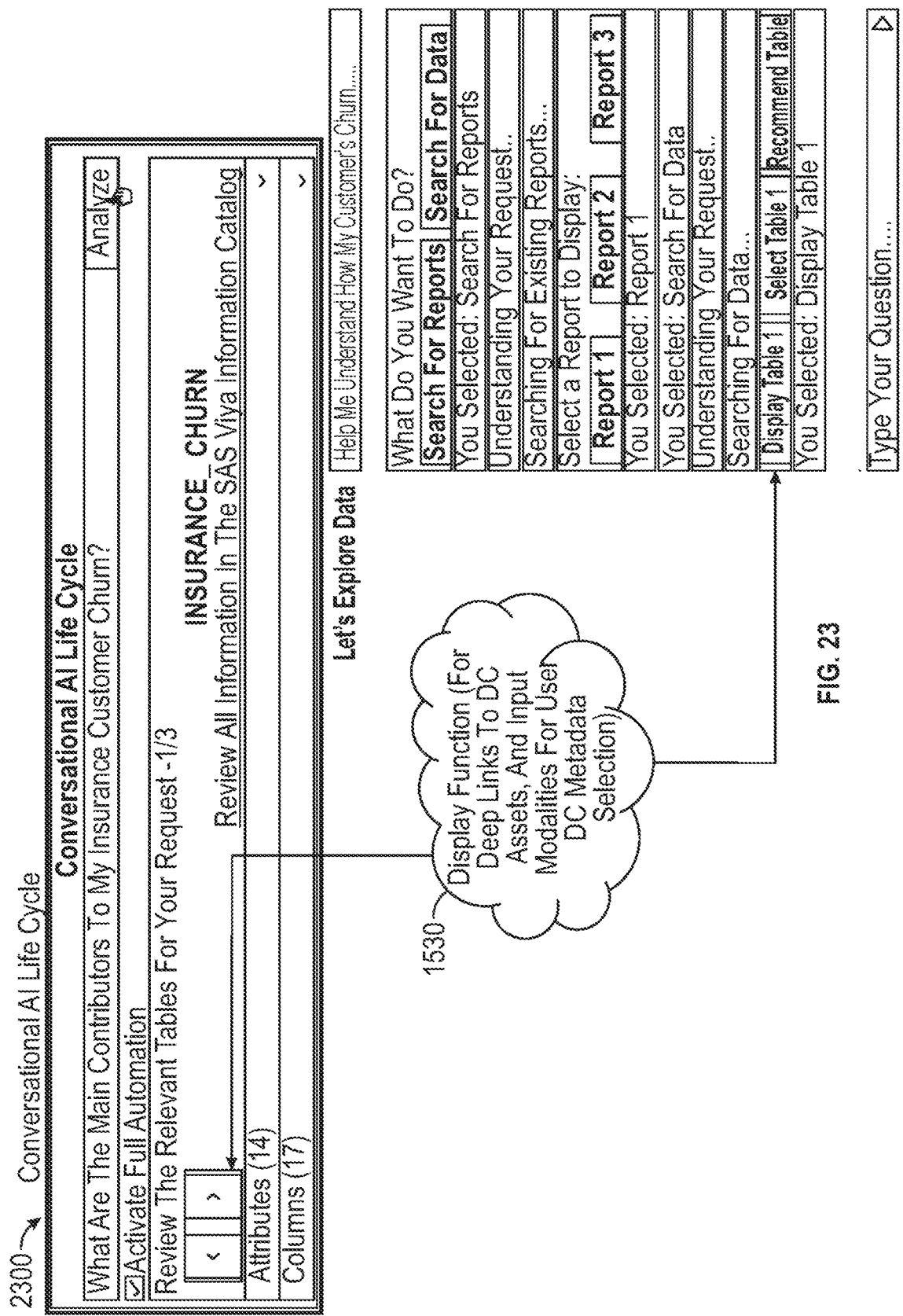

GUI 2300 of FIG. 23 may illustrate a non-limiting example of a UI for interacting with system 2000 of FIG. 20 to perform techniques associated with sub-process 1418. For instance, GUI 2300 may depict a set of DC results (e.g., information associated with tables retrieved from the DC application) that a user may select from as well as a set of analytical tasks (e.g., displaying a table, selecting a table, recommending a table) that may be performed on the table. For instance, as a result of a structured DC query (e.g., structured DC query 1622), an indication of a set of tables may be returned to a system or device hosting GUI 2300. The tables may be displayed to a user via display function 1530 and the user may select between the tables using a set of UI control elements. For instance, in a non-limiting example, three tables may be returned. The display function 1530 may additionally display metadata associated with each of the tables (e.g., information associated 14 attributes and 17 columns for a first of the three tables).

Additionally, a user may be prompted by GUI 2300 via display function 1530 to request an action associated with the returned tables (e.g., search for reports, search for data) via a corresponding set of control elements. GUI 2300 may, via display function 1530, provide an indication of the action requested by the user (e.g., "You selected: Search for Reports"), may provide an indication that it is processing the request (e.g., "Understanding your request . . . Searching for existing reports"), and may provide a response to the request. In some examples, the response to the request may be an additional request for an action associated with the returned tables via a set of corresponding control elements (e.g., an indication to select a first report associated with a first of the three tables, to select a second report associated with a second of the three tables, or to select a third report associated with a third of the three tables). GUI 2300 may display, via display function 1530, an indication of the action requested by the user (e.g., "You selected: Report 1."). In a non-limiting example, the GUI 2300 may display, via display function 1530, an indication that a user has requested a search for data (e.g., "You selected: Search for Data"), may indicate that it is processing the requested search for data (e.g., "Understanding your request . . . Searching for data . . . "), and may prompt the user to perform an associated action via a set of control elements (e.g., "Display Table 1", "Select Table 1", "Recommend Table"). GUI 2300 may display the requested action by the user (e.g., "You selected: Display Table 1").

Referring to FIG. 14, sub-process 1420 of process 1410 may prompt the LLM to select most relevant refined DC results. Sub-process 1420 may proceed to process 1421 of method 1400 and/or sub-process 1422 of process 1410.

Referring to FIG. 14, process 1421 of method 1400 may log the LLM prompt and/or response in the QLD folder.

Figure 24:
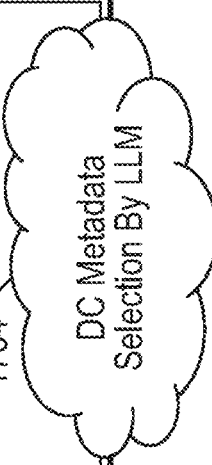

GUI 2400 of FIG. 24 may illustrate a non-limiting example of a UI interacting with system 2000 of FIG. 20 to perform techniques associated with sub-process 1420. For instance, GUI 2400 may depict displaying of DC metadata selection information 1734 provided by the LLM via display function 1530 (e.g., the LLM selecting a table labeled "INSURANCE_CHURN"). In some examples, enabling the LLM to select a table may include providing the returned result of structured DC queries 1622 to an API endpoint associated with an LLM provider (e.g., the LLM provider for LLMs 1620a-n) along with a compound prompt indicating for the LLM to perform the selection.

Data catalog metadata selection mechanism 1700 may represent a non-limiting example of selecting DC metadata according to process 1410 as well as one or more of sub-processes 1414, 1416, and 1418-1421. For instance, structured DC queries 1622 may be generated as described herein and the DC 1710 may be queried according to the structured DC queries 1622. Metadata 1712 (e.g., metadata for selection) associated with the DC 1710 may be returned as a result of the query. In examples in which the user performs selection, display function 1530 may display the metadata and the user may generate DC metadata selection information 1722. The DC metadata selection information 1722 may be logged in the QLD folder 1610. Alternatively, if the LLM performs the selection, the metadata 1712 may be provided to the question classifier and prompt engineering module 1602 along with one or more of the user question 1502, the user permission scope 1604, and the user credential specific context-prompts and/or pre-prompts 1606. The question classifier and prompt engineering module 1602 may output a compound prompt 1732 (e.g., a compound prompt for identifying most relevant DC metadata) and may provide the compound prompt 1732 to an LLM instance 1620 (e.g., a user-provisioned LLM instance). The LLM instance 1620 may determine DC metadata selection information 1734 and may log DC metadata selection information 1734 at QLD folder 1610. In some examples, the DC metadata 1712 may be logged at the QLD folder 1610.

Referring to FIG. 14, sub-process 1422 of process 1410 may prompt the LLM to identify the most relevant AA from an available crew (e.g., set) of AAs to answer a user question based on selected DC results. For instance, sub-process 1422 may prompt the analytical task-oriented LLM to identify a given analytical task from a set of analytical tasks associated with an analytical service executable by a given analytical agent of a set of analytical agents of the analytical service based on an input to the analytical task-oriented LLM of at least a portion of the metadata associated with the at least one element. In some examples, each AA of the set of AAs may be uniquely assigned to automatically execute a distinct analytical task of the set of analytical tasks available within an analytical computing environment. In some examples, the set of AAs may include a data quality agent, an SQL query agent, a reporting agent, a modeling agent, or a combination thereof. Each agent may be a wrapper around a set of APIs that operate according to a set of best practices or that use trusted metrics provided by a DC to guide the process.

In examples in which the analytical task-oriented LLM generates a prediction of one or more likely analytical tasks for handling the natural language query based on an input of the natural language query, the given AA may be selectively activated from the set of AAs based on the user selecting the given analytical task from the one or more likely analytical tasks. In some examples, each analytical agent of the set of analytical agents includes a software module or a computational module, implemented by one or more computers of the analytical service, that is programmed to execute at least one analytical task autonomously within an analytical computing environment based on input data and metadata retrieved from the data catalog application. Sub-process 1422 of process 1410 may proceed to process 1423 of method 1400 and/or sub-process 1424 of process 1410.

Figure 18:
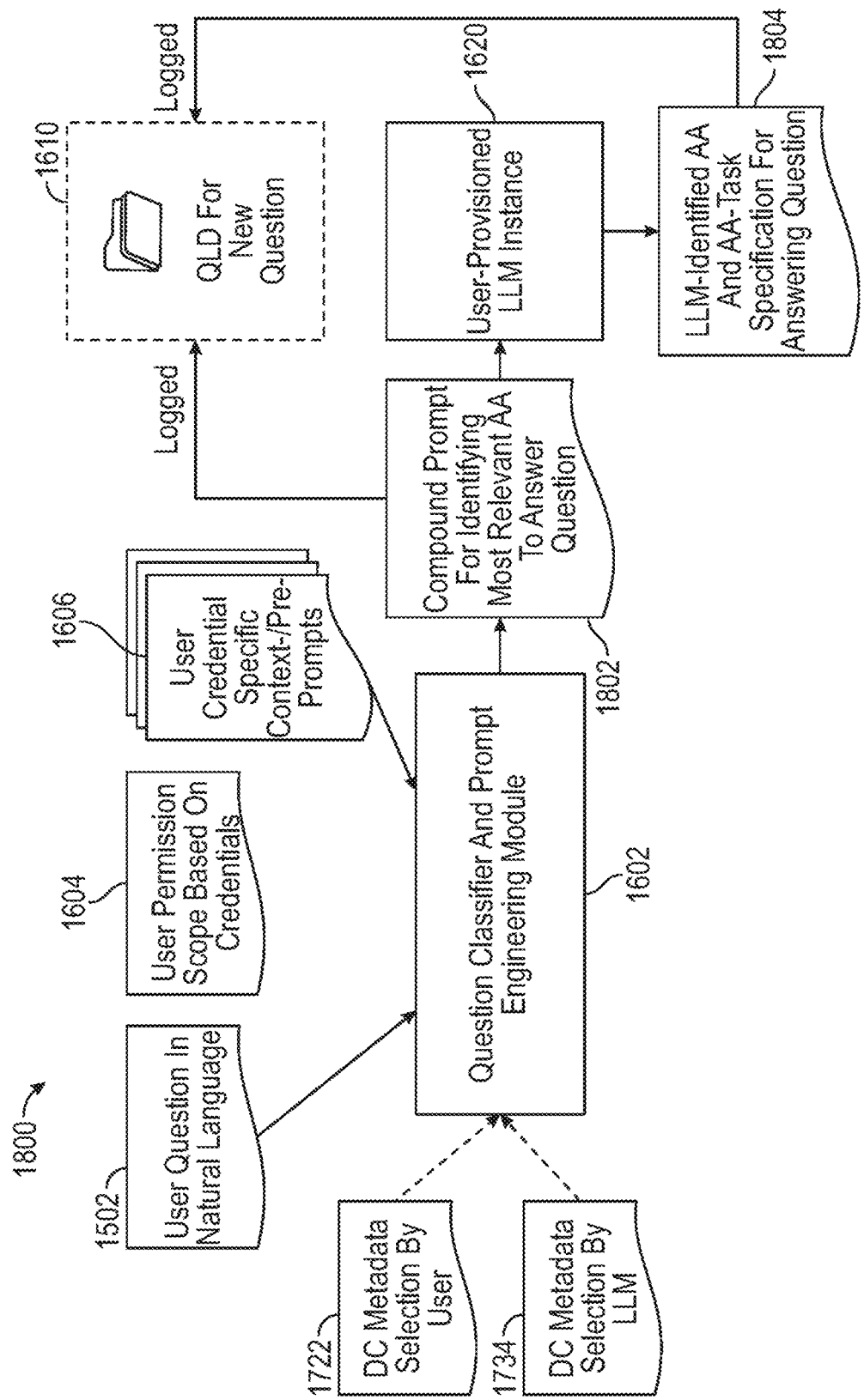
FIG. 18 illustrates an example of an analytical agent identification mechanism, according to some embodiments of the present technology.

Analytical agent identification mechanism 1800 of FIG. 18 may represent a non-limiting example of identifying an AA according to process 1410 and sub-process 1422. For instance, as described herein, question classifier and prompt engineering module 1602 may receive one or more of a user question 1502, a user permission scope 1604, user credential specific context-prompts and/or pre-prompts 1606, DC metadata selection information 1722, DC metadata selection information 1734, or a combination thereof. Question classifier and prompt engineering module 1602 may generate a compound prompt 1802 (e.g., a compound prompt for identifying a most relevant AA to answer the user question 1502) and may log the compound prompt at the QLD folder 1610. Additionally, the question classifier and prompt engineering module may provide the compound prompt 1802 to a user-provisioned LLM instance 1620 and the LLM instance may generate an LLM-identified AA and an AA task specification 1804 for answering a user question. The LLM-identified AA and the AA task specification 1804 may be logged at the QLD folder 1610.

Figure 25:
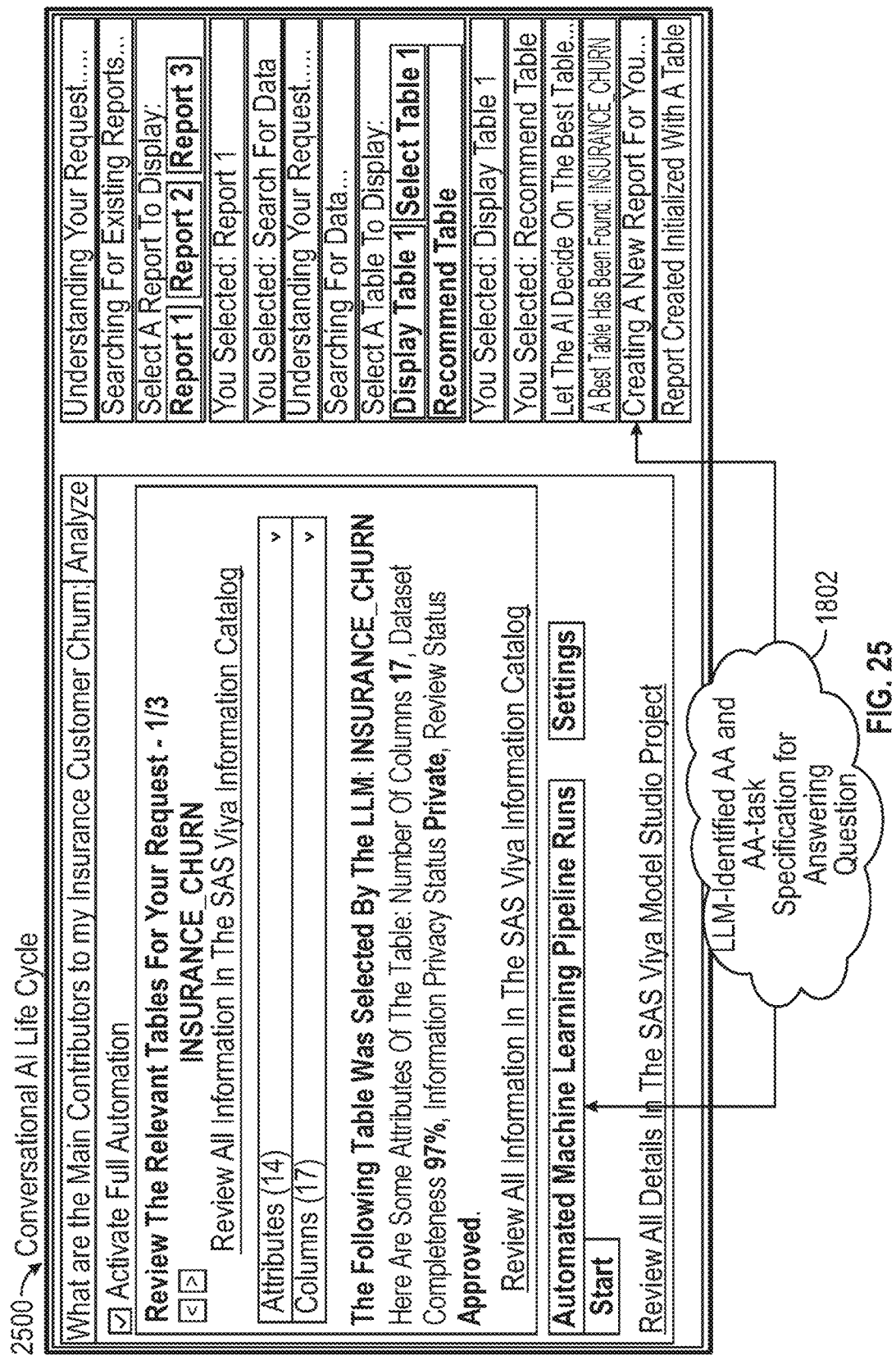

An example of an LLM-identified AA and AA-task specification 1804 being displayed is shown in GUI 2500 of FIG. 25. In such examples, an AA associated with creating a report may be the LLM-identified AA and creating the report may be the AA-task specification. For instance, a user may indicate, via GUI 2500, to recommend a table and an associated LLM may determine a table to recommend to the user (e.g., INSURANCE_CHURN). Upon recommending the table, the LLM further identifies an associated task to perform on the table. For instance, in a non-limiting example, the LLM may determine to generate a report for the table and the system hosting GUI 2500 may indicate to an AA responsible for generating reports to generate the report associated with the table. GUI 2500 may display an indication that the report is being generated via display function 1530.

Referring to FIG. 14, process 1423 of method 1400 may log the LLM prompt and AA identification in the QLD folder.

Referring to FIG. 14, sub-process 1424 of process 1410 may display a prompt for user reselection of most relevant AA to answer a user question identified by the LLM. For instance, sub-process 1424 may allow, via the user interface, dynamic user intervention within a mid-stream of the LLM-directed workflow, where the dynamic user intervention may cause an interruption of one or more operations of the LLM-directed workflow in advance of an output response. In manual mode (e.g., if set at 1406), the user may decide if the suggestion is followed or one of the other agents is used. Selected agents may, in some cases, provide additional configuration options to the user to further guide the process. In the automatic mode (e.g., set at 1406), the suggested agent is run. Content that is generated by agents gets saved to a folder created beforehand (e.g., QLD folder). The run of the AAs may be influenced by a metric from a DC (e.g., columns that are flagged as private or sensitive may be rejected from a modeling process and assessed for bias). Sub-process 1410 may proceed to process 1425 of method 1400 and/or sub-process 1426 of process 1410.

Referring to FIG. 14, process 1425 of method 1400 may log user reselection (if any) in the QLD folder.

Referring to FIG. 14, sub-process 1426 of process 1410 may autonomously run one or more AAs to answer the user question (e.g., selected by the LLM and/or user) based on selected DC results. For instance, sub-process 1426 may automatically execute, by the given AA of the set of AAs, the given analytical task, based on at least one element accessible to the DC application. In some examples, executing the given analytical task may include accessing data from one or more data structures that include the at least one element and generating by the given AA an analytical artifact based on the data accessed from the one or more data structures, where the output response includes the analytical artifact. In some examples, automatically executing, by a given analytical agent of a set of analytical agents, a given analytical task includes identifying that a historical analytical artifact for handling the natural language query was previously stored within a memory and retrieving from the memory the historical analytical artifact, where the output response includes the historical analytical artifact. In some examples, each distinct analytical task of the set of analytical tasks maps to a distinct analytical agent of the set of analytical agents and the analytical task-oriented LLM may select the given analytical agent of the set of analytical agents based on identifying a mapping between the given analytical task and the given analytical agent.

Referring to FIG. 14, sub-process 1428 of process 1410 may display an answer to the user question from the one or more AAs with a prompt window for follow up questions. For instance, sub-process 1427 may return, via the user interface, an output response to the natural language query based on a completion of the given analytical task by the given analytical agent. In some examples, the output response may be indirectly facilitated through the analytical task-oriented LLM interfacing with the set of AAs programmed with functionalities for autonomously executing analytic tasks within an analytical computing environment. Additionally, or alternatively, sub-process 1426 may display deep links to the QLD folder for (optionally) modifying AA-generated content.

In some examples, the LLM-directed workflow includes a sequence of automated operations for querying a DC application and generating an output response to the user-provided query or prompt (e.g., a natural language query) in response to one or more outputs of an analytical task-oriented LLM. In some examples, LLM calls may be routed through a gateway that automatically tracks LLM calls, monitors associated costs and/or amounts of input or output tokens, stores requests in a vector database, routes to a different LLMs in particular circumstances, or a combination thereof.

Referring to FIG. 14, process 1429 of method 1400 may log the answer to the user question, follow-up questions (if any), and created content modifications (if any) in the QLD folder.

Figure 19:
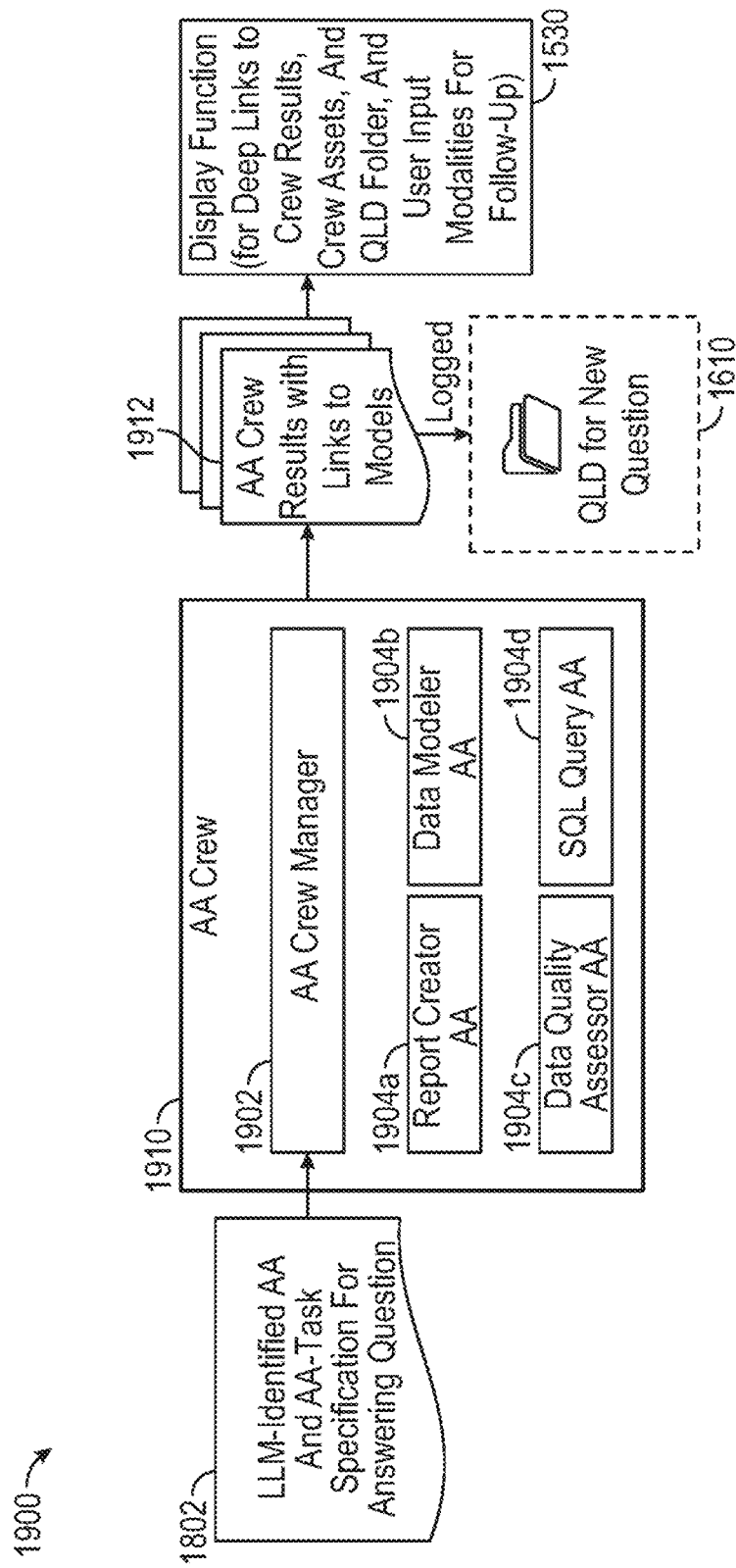
FIG. 19 illustrates an example of an analytical agent execution mechanism, according to some embodiments of the present technology.
Figure 26:
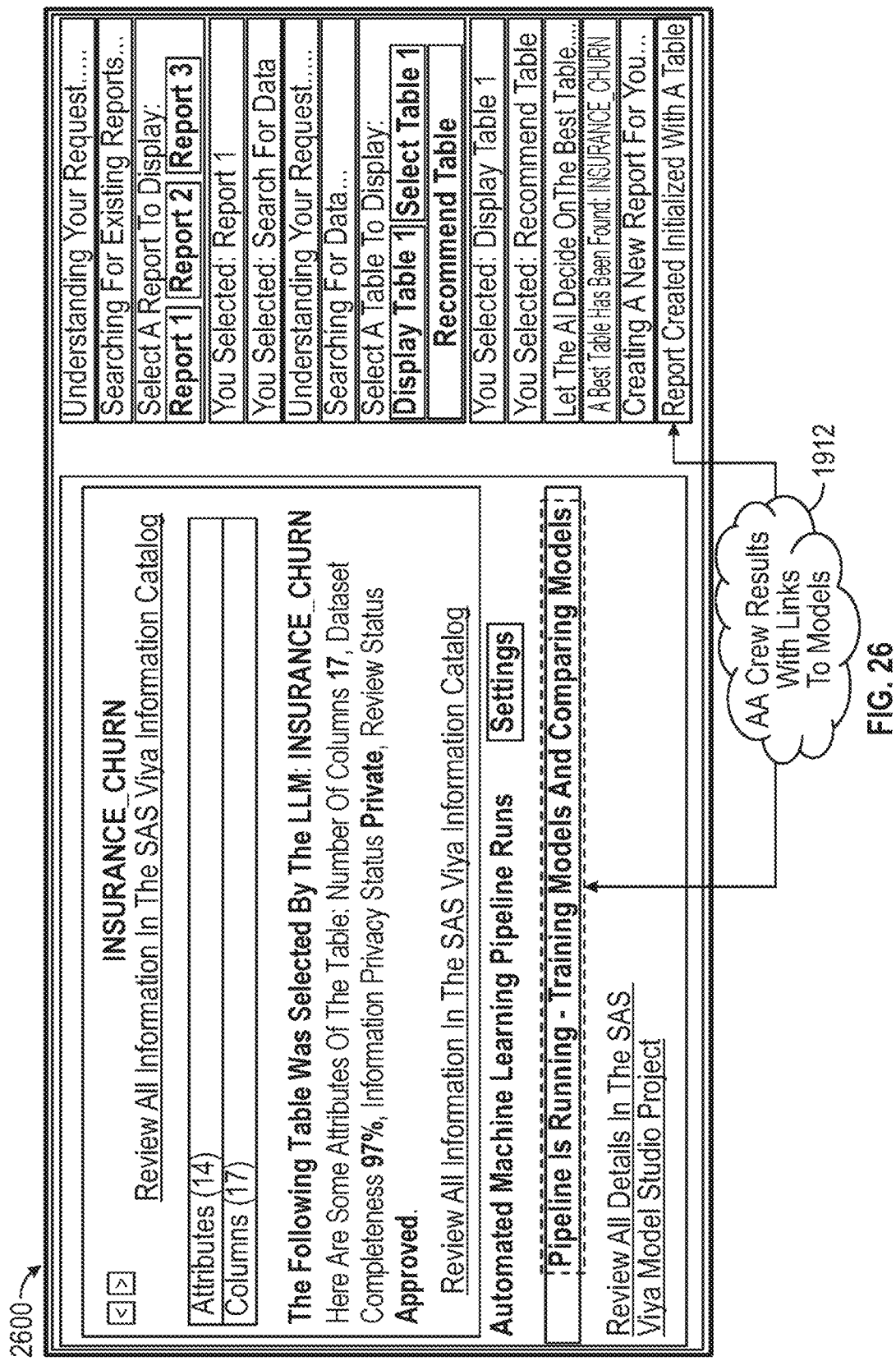

Analytical agent execution mechanism 1900 of FIG. 19 may represent a non-limiting example for running AAs and displaying their results according to process 1410 and sub-process 1428. For instance, an LLM-identified AA and AA-task specification 1804 may be generated as described herein and provided to AA crew 1910. AA crew 1910 may include an AA crew manager 1902 and one or more of a report creator AA 1904a, a data modeler AA 1904b, a data quality assessor AA 1904c, and a SQL query AA 1904d, where each AA may be associated with a distinct task. AA crew manager 1902 may select the identified AA, may run the AA, and may put the results with links to models in QLD folder 1610. Additionally, the results may be displayed. An example of a crew result 1912 being displayed is shown in GUI 2600 of FIG. 26. For instance, GUI 2600 may display, via display function 1530, an indication that a report has been created and initialized with a table. In some examples, the crew result may correspond to the creation of the report and the initialization of the table and the links to models may include links to training models and comparing models.

In some examples, system 2000 may be configured to implement sub-processes 1426 through 1428 of process 1410. For instance, compute resource utilization gateway 1612 and LLMs 1620a-n may provide information about an AA to utilize to crew 1910 and the selected AA may be run. Information about the selected AA 1610 and the result of running the AA may be provided to QLD folder 1610. Additionally, the results may be displayed via display function 1530.

In some examples, the techniques described herein may be LLM agnostic. For instance, the techniques described herein may be performed with any of multiple types of LLMs (e.g., ChatGPT-like LLMs, Anthropic-like LLMs).

Figure 14A:
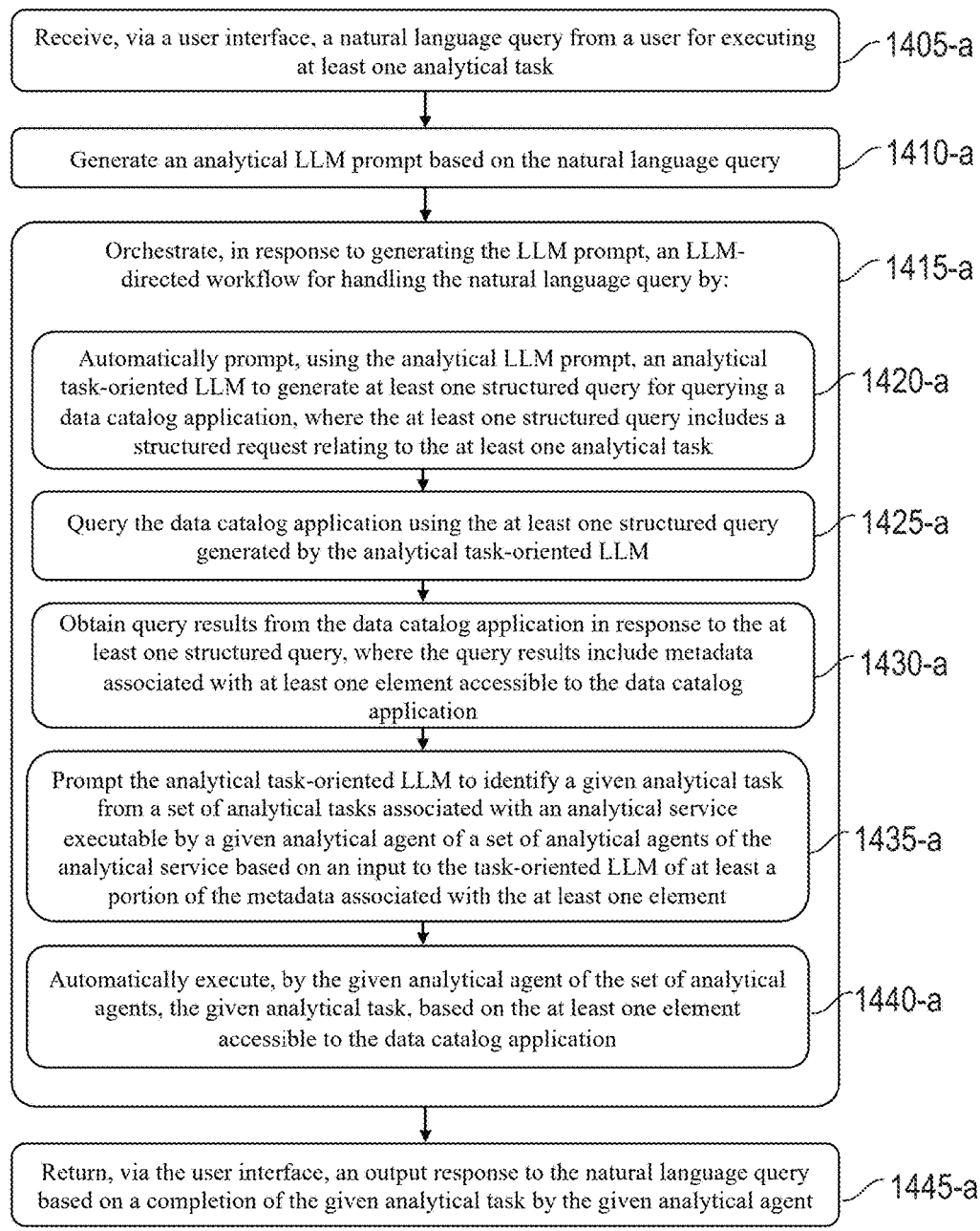
FIG. 14A illustrates an example of a method for predicting action likelihood based on linguistic patterns of a text processing model, according to some embodiments of the present technology.

FIG. 14A illustrates one embodiment of method 1400-a for securing LLM-assisted interactions with a data catalog. It shall be appreciated that other embodiments contemplated within the scope of the present disclosure may involve more processes, fewer processes, different processes, or a different order of processes than illustrated in FIG. 14A. It should be noted that a computer-program product may include a non-transitory machine-readable storage medium storing computer instructions that, when executed by one or more operations, may perform operations corresponding to the processes and sub-processes of method 1400-a. Additionally, or alternatively, a computer-implemented method may include operations corresponding to processes and sub-processes of 1400-a. Additionally, or alternatively, a computer-implemented system may include one or more processors, a memory, and a computer-readable medium operably coupled to the one or more processors, the computer-readable medium having computer-readable instructions stored thereon that, when executed by the one or more processors, cause a computing device to perform operations corresponding to the processes and sub-processes of method 1400-a.

Process 1405-a of FIG. 14A may receive, via a user interface, a natural language query from a user for executing at least one analytical task.

Process 1410-a of FIG. 14A may generate an analytical large language model (LLM) prompt based on the natural language query.

Process 1415-a of FIG. 14A, in response to generating the analytical LLM prompt, may orchestrate an LLM-directed workflow for handling the natural language query by executing one or more of sub-processes 1420-a, 1425-a, 1430-a, 1435-a, or 1440-a.

Sub-process 1420-a may automatically prompt, using the analytical LLM prompt, an analytical task-oriented LLM to generate at least one structured query for querying a data catalog application, where the at least one structured query includes a structured request relating to the at least one analytical task associated with the natural language query (e.g., using text, audio, an image, graphics, video, or a mixed-modality combination thereof).

Sub-process 1425-a may query the data catalog application using the at least one structured query generated by the analytical task-oriented LLM.

Sub-process 1430-a may obtain query results from the data catalog application in response to the at least one structured query, where the query results include metadata associated with at least one element accessible to the data catalog application.

Sub-process 1435-a may prompt the analytical task-oriented LLM to identify a given analytical task from a set (e.g., a plurality) of analytical tasks associated with an analytical service executable by a given analytical agent of a set (e.g., a plurality) of analytical agents of the analytical service based on an input to the analytical task-oriented LLM of at least a portion of the metadata associated with the at least one element.

Sub-process 1440-a may automatically execute, by the given analytical agent of the plurality of analytical agents, the given analytical task, based on the at least one element accessible to the data catalog application.

Process 1445-a may return, via the user interface, an output response to the natural language query based on a completion of the given analytical task by the given analytical agent.

In some examples, process 1415-a may selectively enable access to a subset of analytical agents of the set of analytical agents and disable access to a different subset of analytical agents of the set of analytical agents based on authorization credentials associated with the user. In such examples, the given analytical agent performing the given analytical task may be selected from the subset of analytical agents.

In some examples, process 1415-a may selectively enable access to a subset of analytical LLMs of a set of LLMs and disable access to a different subset of LLMs of the set of LLMs based on authorization credentials associated with the user. In such examples, the analytical task-oriented LLM associated with the LLM-directed workflow may be selected from the subset of LLMs.

In some examples, the natural language query includes a natural language analytical request. In such examples, generating the at least one structured query (e.g., by sub-process 1420-a) may include transforming by the analytical task-oriented LLM the natural language analytical request to the at least one structured query based on query structures associated with the data catalog application. Additionally, or alternatively, process 1415-a may translate, by the analytical task-oriented LLM, the natural language analytical request to a set (e.g., a plurality) of structured queries, the set of structured queries having query structures associated with the data catalog application.

In some examples, process 1415-a may allow, via the user interface, dynamic user intervention within a mid-stream of the LLM-directed workflow, where the dynamic user intervention causes an interruption of one or more operations of the LLM-directed workflow in advance of the return of the output response.

In some examples, the output response may be indirectly facilitated through the analytical task-oriented LLM interfacing with the set of analytical agents programmed with functionalities for autonomously executing analytic tasks within an analytical computing environment. Additionally, or alternatively, each analytical agent of the set of analytical agents may be uniquely assigned to automatically execute a distinct analytical task of the set of analytical tasks available within an analytical computing environment.

In some examples, sub-process 1440-a executing the given analytical task may include sub-process 1440-a accessing data from one or more data structures that include the at least one element and generating by the given analytical agent an analytical artifact based on the data accessed from the one or more data structures, where the output response includes the analytical artifact.

In some examples, the analytical task-oriented LLM generates a prediction of one or more likely analytical tasks for handling the natural language query based on an input of the natural language query and the given analytical agent is selectively activated from the plurality of analytical agents based on the user selecting the given analytical task from the one or more likely analytical tasks. Additionally, or alternatively, the LLM-directed workflow includes a sequence of automated operations for querying the data catalog application and generating the output response to the natural language query in response to one or more outputs of the analytical task-oriented LLM.

In some examples, sub-process 1440-a automatically executing, by the given analytical agent of the set of analytical agents, the given analytical task includes sub-process 1440-a identifying that a historical analytical artifact for handling the natural language query was previously stored within a memory and retrieving from the memory the historical analytical artifact, where the output response includes the historical analytical artifact.

In some examples, the data catalog application stores and manages metadata corresponding to diverse data sources and the at least one structured query generated by the analytical task-oriented LLM includes one or more query parameters configured based on a metadata schema of the data catalog application. Additionally, or alternatively, each distinct analytical task of the plurality of analytical tasks maps to a distinct analytical agent of the set of analytical agents and the analytical task-oriented LLM selects the given analytical agent of the set of analytical agents based on identifying a mapping between the given analytical task and the given analytical agent.

In some examples, a vector encoder may convert the natural language query to a vector representation. In such examples, process 1415-a may assess the vector representation of the natural language query against a plurality of vector representations of historical analytical responses to historical natural language queries that are stored within a computer database associated with the analytical service. Additionally, process 1415-a may identify a match between the vector representation of the natural language query and at least one vector representation of a historical analytical response from the computer database and may bypass a generation of a new output response to the natural language query based on the match between the vector representation of the natural language query and the at least one vector representation of a historical analytical response, where the output response comprises the historical analytical response.

In some examples, process 1410-a generating the analytical LLM prompt based on the natural language query includes process 1410-a classifying, by a question classification model, the natural language query to at least a first given query type of a set of distinct query types; in response to the classification of the natural language query, mapping the first given query type associated with the natural language query to a first analytical LLM prompt of a set of distinct analytical LLM prompts designed for the analytical task-oriented LLM; and generating the analytical prompt based on the first analytical LLM prompt. Additionally, process 1410-a generating the LLM prompt based on the natural language query may further include process 1410-a classifying, by the question classification model, the natural language query to at least a second given query type of a plurality of distinct query types; in response to the classification of the natural language query, mapping the second given query type associated with the natural language query to a second analytical LLM prompt of the set of distinct analytical LLM prompts designed for the analytical task-oriented LLM; and generating the analytical prompt based on the first analytical LLM prompt and the second analytical LLM prompt, wherein the analytical prompt includes a compound analytical LLM prompt that converges the first analytical LLM prompt and the second analytical LLM prompt into a single prompt input to the analytical task-oriented LLM.

In some examples, the analytical task-oriented LLM parses the natural language query into distinct query components, each distinct query component corresponds to a different aspect of a metadata schema of the data catalog application, and the analytical task-oriented LLM constructs a multi-part structured query based on the distinct query components of the natural language query. Additionally, or alternatively, each analytical agent of the set of analytical agents includes a software module or a computational module, implemented by one or more computers of the analytical service, that is programmed to execute at least one analytical task autonomously within an analytical computing environment based on input data and metadata retrieved from the data catalog application.

In some examples, process 1410-*a* generating analytical LLM prompt includes process 1410-*a* converting the natural language query to one or more embeddings or one or more vectors; mapping the one or more embeddings or the one or more vectors into a N-dimensional space including a set of N distinct vectors, where each vector corresponds to a distinct analytical LLM prompt of a set of analytical LLM prompts; and selecting the analytical LLM prompt from the set of analytical LLM prompts based at least in part on the mapping.

In some examples, sub-process 1420-*a* prompting the analytical task-oriented LLM to generate the at least one structured query for querying the data catalog application includes: providing, to a first application programming interface (API) endpoint, first signaling that includes an indication of the analytical LLM prompt; and receiving, from the first API endpoint, second signaling that includes a message for an API function call, where the message includes an indication of the at least one structured query, and where querying the data catalog application includes routing the API function call to a second API endpoint associated with the data catalog application.

It shall be noted that the system and methods described herein can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, memory sticks (e.g., SD cards, USB flash drives), cloud-based services (e.g., cloud storage), magnetic storage devices, Solid-State Drives (SSDs), or any suitable device. The computer-executable component is preferably a general or application-specific processor, but any suitable dedicated hardware or hardware/firmware combination device can alternatively or additionally execute the instructions.

The systems and methods of the preferred embodiments may additionally, or alternatively, be implemented on an integrated data analytics software application and/or software architecture such as those offered by SAS Institute Inc. of Cary, N.C., USA. Merely for illustration, the systems and methods of the preferred embodiments may be implemented using or integrated with one or more SAS software tools such as SAS® Viya™ which is developed and provided by SAS Institute Inc. of Cary, N.C., USA.

Although omitted for conciseness, the preferred embodiments include every combination and permutation of the implementations of the systems and methods described herein.

As a person skilled in the art will recognize from the previous detailed description and from the figures and claims, modifications and changes can be made to the embodiments of the disclosure without departing from the scope of the various described embodiments.

What is claimed is:

1. A computer-program product comprising a non-transitory machine-readable storage medium storing computer instructions that, when executed by one or more processors, perform operations comprising:
   receiving, via a user interface, a natural language query from a user for executing at least one analytical task;
   generating an analytical large language model (LLM) prompt based on the natural language query;
   in response to generating the analytical LLM prompt, orchestrating an LLM-directed workflow for handling the natural language query, by:
      automatically prompting, using the analytical LLM prompt, an analytical task-oriented LLM to generate at least one structured query for retrieving, from a data catalog application, a recommendation of one or more tables relating to the natural language query and accessible to the data catalog application, wherein the at least one structured query includes a structured request relating to the at least one analytical task associated with the natural language query;
      querying the data catalog application using the at least one structured query generated by the analytical task-oriented LLM;
      obtaining query results from the data catalog application in response to the at least one structured query, wherein the query results include:
         an indication of the one or more recommended tables accessible to the data catalog application, and
         metadata associated with the one or more recommended tables;
      prompting the analytical task-oriented LLM to identify a given analytical task from a plurality of analytical tasks associated with an analytical service executable by a given analytical agent of a plurality of analytical agents of the analytical service based on an input to the analytical task-oriented LLM of at least a portion of the metadata associated with the one or more recommended tables; and
      automatically executing, by the given analytical agent of the plurality of analytical agents, the given analytical task, based on the at least one one or more recommended tables accessible to the data catalog application; and
   returning, via the user interface, an output response to the natural language query based on a completion of the given analytical task by the given analytical agent.

2. The computer-program product according to claim 1, wherein:
   prompting the analytical task-oriented LLM to identify the given analytical task comprises prompting the analytical task-oriented LLM to select an analytical agent from the plurality of analytical agents, the selected analytical agent being the given analytical agent that executes the given analytical task; and
   the computer-program product performs operations further comprising:
   selectively enabling access to a subset of analytical agents of the plurality of analytical agents and disabling access to a different subset of analytical agents of the plurality of analytical agents based on authorization credentials associated with the user,
   wherein the given analytical agent performing the given analytical task is selected from the subset of analytical agents.

3. The computer-program product according to claim 1, wherein:
   the given analytical agent is programmed to execute a data modeling task autonomously task based on the metadata;
   automatically executing the given analytical task comprises automatically executing the data modeling task based on the metadata; and
   the computer-program product performs operations further comprising:

selectively enabling access to a subset of analytical LLMs of a plurality of LLMs and disabling access to a different subset of LLMs of the plurality of LLMs based on authorization credentials associated with the user, wherein the analytical task-oriented LLM associated with the LLM-directed workflow is selected from the subset of LLMs.

4. The computer-program product according to claim 1, wherein:

the natural language query comprises a natural language analytical request, and generating the at least one structured query includes transforming by the analytical task-oriented LLM the natural language analytical request to the at least one structured query based on query structures associated with the data catalog application.

5. The computer-program product according to claim 1, wherein:

the natural language query comprises a natural language analytical request, and the performing operations further comprise:
translating, by the analytical task-oriented LLM, the natural language analytical request to a plurality of structured queries, the plurality of structured queries having query structures associated with the data catalog application.

6. The computer-program product according to claim 1 performing operations further comprising:

allowing, via the user interface, dynamic user intervention within a mid-stream of the LLM-directed workflow, wherein the dynamic user intervention causes an interruption of one or more operations of the LLM-directed workflow in advance of the return of the output response.

7. The computer-program product according to claim 1, wherein the output response is indirectly facilitated through the analytical task-oriented LLM interfacing with the plurality of analytical agents programmed with functionalities for autonomously executing analytic tasks within an analytical computing environment.

8. The computer-program product according to claim 1, wherein each analytical agent of the plurality of analytical agents is uniquely assigned to automatically execute a distinct analytical task of the plurality of analytical tasks available within an analytical computing environment.

9. The computer-program product according to claim 1, wherein executing the given analytical task includes:

accessing data from one or more data structures that include the one or more recommended tables; and generating by the given analytical agent an analytical artifact based on the data accessed from the one or more data structures, wherein the output response includes the analytical artifact.

10. The computer-program product according to claim 1, wherein:

the analytical task-oriented LLM generates a prediction of one or more likely analytical tasks for handling the natural language query based on an input of the natural language query, and the given analytical agent is selectively activated from the plurality of analytical agents based on the user selecting the given analytical task from the one or more likely analytical tasks.

11. The computer-program product according to claim 1, wherein the LLM-directed workflow comprises a sequence of automated operations for querying the data catalog application and generating the output response to the natural language query in response to one or more outputs of the analytical task-oriented LLM.

12. The computer-program product according to claim 1, wherein:

automatically executing, by the given analytical agent of the plurality of analytical agents, the given analytical task includes:
identifying that a historical analytical artifact for handling the natural language query was previously stored within a memory, and
retrieving from the memory the historical analytical artifact, wherein the output response comprises the historical analytical artifact.

13. The computer-program product according to claim 1, wherein:

the data catalog application stores and manages metadata corresponding to diverse data sources, and the at least one structured query generated by the analytical task-oriented LLM includes one or more query parameters configured based on a metadata schema of the data catalog application.

14. The computer-program product according to claim 1, wherein:

each distinct analytical task of the plurality of analytical tasks maps to a distinct analytical agent of the plurality of analytical agents, and the analytical task-oriented LLM selects the given analytical agent of the plurality of analytical agents based on identifying a mapping between the given analytical task and the given analytical agent.

15. The computer-program product according to claim 1, wherein:

a vector encoder converts the natural language query to a vector representation; and assessing the vector representation of the natural language query against a plurality of vector representations of historical analytical responses to historical natural language queries that are stored within a computer database associated with the analytical service.

16. The computer-program product according to claim 15, performing operations further comprising:

identifying a match between the vector representation of the natural language query and at least one vector representation of a historical analytical response from the computer database; and bypassing a generation of a new output response to the natural language query based on the match between the vector representation of the natural language query and the at least one vector representation of a historical analytical response, wherein the output response comprises the historical analytical response.

17. The computer-program product according to claim 1, wherein generating the analytical LLM prompt based on the natural language query includes:

classifying, by a question classification model, the natural language query to at least a first given query type of a plurality of distinct query types;

in response to the classification of the natural language query, mapping the first given query type associated with the natural language query to a first analytical LLM prompt of a plurality of distinct analytical LLM prompts designed for the analytical task-oriented LLM; and generating the analytical prompt based on the first analytical LLM prompt.

18. The computer-program product according to claim 17, wherein generating the analytical LLM prompt based on the natural language query further includes:
   classifying, by the question classification model, the natural language query to at least a second given query type of a plurality of distinct query types;
   in response to the classification of the natural language query, mapping the second given query type associated with the natural language query to a second analytical LLM prompt of the plurality of distinct analytical LLM prompts designed for the analytical task-oriented LLM; and
   generating the analytical prompt based on the first analytical LLM prompt and the second analytical LLM prompt, wherein the analytical prompt comprises a compound analytical LLM prompt that converges the first analytical LLM prompt and the second analytical LLM prompt into a single prompt input to the analytical task-oriented LLM.

19. The computer-program product according to claim 1, wherein:
   the analytical task-oriented LLM parses the natural language query into distinct query components,
   each distinct query component corresponds to a different aspect of a metadata schema of the data catalog application, and
   the analytical task-oriented LLM constructs a multi-part structured query based on the distinct query components of the natural language query.

20. The computer-program product according to claim 1, wherein each analytical agent of the plurality of analytical agents comprises a software module or a computational module, implemented by one or more computers of the analytical service, that is programmed to execute at least one analytical task autonomously within an analytical computing environment based on input data and metadata retrieved from the data catalog application.

21. The computer-program product according to claim 1, wherein generating the analytical LLM prompt comprises:
   converting the natural language query to one or more embeddings or one or more vectors;
   mapping the one or more embeddings or the one or more vectors into a N-dimensional space including a set of N distinct vectors, wherein each vector corresponds to a distinct analytical LLM prompt of a set of analytical LLM prompts; and
   selecting the analytical LLM prompt from the set of analytical LLM prompts based at least in part on the mapping.

22. The computer-program product according to claim 1, wherein prompting the analytical task-oriented LLM to generate the at least one structured query for querying the data catalog application comprises:
   providing, to a first application programming interface (API) endpoint, first signaling that comprises an indication of the analytical LLM prompt; and
   receiving, from the first API endpoint, second signaling that comprises a message for an API function call, wherein the message comprises an indication of the at least one structured query, and wherein querying the data catalog application comprises routing the API function call to a second API endpoint associated with the data catalog application.

23. A computer-implemented method, comprising:
   receiving, via a user interface, a natural language query from a user for executing at least one analytical task;
   generating an analytical large language model (LLM) prompt based on the natural language query; and
   in response to generating the analytical LLM prompt, orchestrating an LLM-directed workflow for handling the natural language query, by:
      automatically prompting, using the analytical LLM prompt, an analytical task-oriented LLM to generate at least one structured query for retrieving, from a data catalog application, a recommendation of one or more tables relating to the natural language query and accessible to the data catalog application, wherein the at least one structured query includes a structured request relating to the at least one analytical task associated with the natural language query;
      querying the data catalog application using the at least one structured query generated by the analytical task-oriented LLM;
      obtaining query results from the data catalog application in response to the at least one structured query, wherein the query results include:
         an indication of the one or more recommended tables accessible to the data catalog application, and
         metadata associated with the one or more recommended tables;
      prompting the analytical task-oriented LLM to identify a given analytical task from a plurality of analytical tasks associated with an analytical service executable by a given analytical agent of a plurality of analytical agents of the analytical service based on an input to the analytical task-oriented LLM of at least a portion of the metadata associated with the one or more recommended tables; and
      automatically executing, by the given analytical agent of the plurality of analytical agents, the given analytical task, based on the at least one one or more recommended tables accessible to the data catalog application; and
   returning, via the user interface, an output response to the natural language query based on a completion of the given analytical task by the given analytical agent.

24. The computer-implemented method according to claim 23, further comprising:
   selectively enabling access to a subset of analytical agents of the plurality of analytical agents and disabling access to a different subset of analytical agents of the plurality of analytical agents based on authorization credentials associated with the user,
   wherein the given analytical agent performing the given analytical task is selected from the subset of analytical agents.

25. The computer-implemented method according to claim 23, further comprising:
   selectively enabling access to a subset of analytical LLMs of a plurality of LLMs and disabling access to a different subset of LLMs of the plurality of LLMs based on authorization credentials associated with the user,
   wherein the analytical task-oriented LLM associated with the LLM-directed workflow is selected from the subset of LLMs.

26. The computer-implemented method according to claim 23, wherein:
   the natural language query comprises a natural language analytical request, and generating the at least one structured query includes transforming by the analytical task-oriented LLM the natural language analytical request to the at least one structured query based on query structures associated with the data catalog application.

27. A computer-implemented system, comprising:
one or more processors;
a memory; and
a computer-readable medium operably coupled to the one or more processors, the computer-readable medium having computer-readable instructions stored thereon that, when executed by the one or more processors, cause a computing device to perform operations comprising:
receiving, via a user interface, a natural language query from a user for executing at least one analytical task;
generating an analytical large language model (LLM) prompt based on the natural language query; and
in response to generating the analytical LLM prompt, orchestrating an LLM-directed workflow for handling the natural language query, by:
automatically prompting, using the analytical LLM prompt, an analytical task-oriented LLM to generate at least one structured query for retrieving, from a data catalog application, a recommendation of one or more tables relating to the natural language query and accessible to the data catalog application, wherein the at least one structured query includes a structured request relating to the at least one analytical task associated with the natural language query;
querying the data catalog application using the at least one structured query generated by the analytical task-oriented LLM;
obtaining query results from the data catalog application in response to the at least one structured query, wherein the query results include:
an indication of the one or more recommended tables accessible to the data catalog application, and
metadata associated with the one or more recommended tables;
prompting the analytical task-oriented LLM to identify a given analytical task from a plurality of analytical tasks associated with an analytical service executable by a given analytical agent of a plurality of analytical agents of the analytical service based on an input to the analytical task-oriented LLM of at least a portion of the metadata associated with the one or more recommended tables; and
automatically executing, by the given analytical agent of the plurality of analytical agents, the given analytical task, based on the at least one one or more recommended tables accessible to the data catalog application; and
returning, via the user interface, an output response to the natural language query based on a completion of the given analytical task by the given analytical agent.

28. The computer-implemented system according to claim 27, wherein the computer-readable instructions, when executed by the one or more processors, cause the computing device to perform operations comprising:
selectively enabling access to a subset of analytical agents of the plurality of analytical agents and disabling access to a different subset of analytical agents of the plurality of analytical agents based on authorization credentials associated with the user,
wherein the given analytical agent performing the given analytical task is selected from the subset of analytical agents.

29. The computer-implemented system according to claim 27, wherein the computer-readable instructions, when executed by the one or more processors, cause the computing device to perform operations comprising:
selectively enabling access to a subset of analytical LLMs of a plurality of LLMs and disabling access to a different subset of LLMs of the plurality of LLMs based on authorization credentials associated with the user,
wherein the analytical task-oriented LLM associated with the LLM-directed workflow is selected from the subset of LLMs.

30. The computer-implemented system according to claim 27, wherein:
the natural language query comprises a natural language analytical request, and
generating the at least one structured query includes transforming by the analytical task-oriented LLM the natural language analytical request to the at least one structured query based on query structures associated with the data catalog application.

* * * * *